US008549135B1

(12) United States Patent
Yazdani

(10) Patent No.: US 8,549,135 B1
(45) Date of Patent: Oct. 1, 2013

(54) METHOD AND APPARATUS FOR PERFORMING QUALITY OF SERVICE IN SECURE NETWORKS

(75) Inventor: Navid Yazdani, Framingham, MA (US)

(73) Assignee: Raytheon Company, Waltham, MA (US)

( * ) Notice: Subject to any disclaimer, the term of this patent is extended or adjusted under 35 U.S.C. 154(b) by 650 days.

(21) Appl. No.: 12/122,055

(22) Filed: May 16, 2008

Related U.S. Application Data

(60) Provisional application No. 60/930,884, filed on May 18, 2007.

(51) Int. Cl.
*G06F 15/173* (2006.01)
*G06F 15/16* (2006.01)

(52) U.S. Cl.
USPC ........... 709/224; 709/226; 726/11; 726/13

(58) Field of Classification Search
USPC ........... 709/218, 224, 226; 370/236; 726/11, 726/13
See application file for complete search history.

(56) References Cited

U.S. PATENT DOCUMENTS

| | | | |
|---|---|---|---|
| 5,802,106 A | 9/1998 | Packer | |
| 6,009,475 A * | 12/1999 | Shrader | 709/249 |
| 6,018,516 A | 1/2000 | Packer | |
| 6,038,216 A | 3/2000 | Packer | |
| 6,046,980 A | 4/2000 | Packer | |
| 6,115,357 A | 9/2000 | Packer | |
| 6,205,120 B1 | 3/2001 | Packer | |
| 6,285,658 B1 | 9/2001 | Packer | |
| 6,298,041 B1 | 10/2001 | Packer | |
| 6,412,000 B1 | 6/2002 | Riddle | |
| 6,456,630 B1 | 9/2002 | Packer | |
| 6,457,051 B1 | 9/2002 | Riddle | |
| 6,563,793 B1 * | 5/2003 | Golden et al. | 370/236 |
| 6,591,299 B2 | 7/2003 | Riddle | |
| 6,741,563 B2 | 5/2004 | Packer | |
| 6,795,918 B1 * | 9/2004 | Trolan | 713/160 |
| 6,850,650 B1 | 2/2005 | Bauschke | |
| 6,928,052 B2 | 8/2005 | Packer | |

(Continued)

FOREIGN PATENT DOCUMENTS

WO    WO 2006128503 A1 * 12/2006

OTHER PUBLICATIONS

Yih-Chun Hu, David B. Johnson; "Securing quality-of-service route discovery in on-demand routing for ad hoc networks", Oct. 2004 SASN '04: Proceedings of the 2nd ACM workshop on Security of ad hoc and sensor networks, pp. 106-117 [retrieved from ACM database on Aug. 9, 2010].*

(Continued)

*Primary Examiner* — Saleh Najjar
*Assistant Examiner* — Lashanya Nash
(74) *Attorney, Agent, or Firm* — Lando & Anastasi, LLP

(57) ABSTRACT

A method is provided for performing control functions in a secure network where security prohibits the transmission of control information beyond secure networks and/or their associated systems. A method is provided for permitting proxy servers to communicate within full DBRA schemes without compromising security. According to various embodiments, methods for IPsec communication are provided that permit systems to move information across secure gateways. In one embodiment, IPsec communication and full DBRA bandwidth/QoS control is provided without compromising security. Although various aspects relate to satellite networks, it should be appreciated that aspects relate to other types of secure networks.

57 Claims, 30 Drawing Sheets

(56) References Cited

U.S. PATENT DOCUMENTS

| | | | |
|---|---|---|---|
| 6,934,255 B1 | 8/2005 | Toporek | |
| 6,934,745 B2 | 8/2005 | Krautkremer | |
| 6,970,432 B1 | 11/2005 | Hankins | |
| 6,990,592 B2* | 1/2006 | Richmond et al. | 726/15 |
| 7,003,572 B1 | 2/2006 | Lownsbrough | |
| 7,012,900 B1 | 3/2006 | Riddle | |
| 7,013,342 B2 | 3/2006 | Riddle | |
| 7,032,072 B1 | 4/2006 | Quinn | |
| 7,035,474 B2 | 4/2006 | Bauschke | |
| 7,054,902 B2 | 5/2006 | Toporek | |
| 7,154,416 B1 | 12/2006 | Savage | |
| 7,155,502 B1 | 12/2006 | Galloway | |
| 7,171,045 B1 | 1/2007 | Hamilton | |
| 7,203,169 B1 | 4/2007 | Okholm | |
| 7,236,459 B1 | 6/2007 | Okholm | |
| 7,283,468 B1 | 10/2007 | Hill | |
| 7,292,531 B1 | 11/2007 | Hill | |
| 7,296,288 B1 | 11/2007 | Hill | |
| 7,318,152 B2* | 1/2008 | Haney | 713/153 |
| 7,324,447 B1 | 1/2008 | Morford | |
| 7,324,553 B1 | 1/2008 | Varier | |
| 7,343,398 B1 | 3/2008 | Lownsbrough | |
| 7,359,395 B2 | 4/2008 | Toporek | |
| 7,359,974 B1 | 4/2008 | Quinn | |
| 7,359,984 B1 | 4/2008 | Hackney | |
| 7,366,101 B1 | 4/2008 | Varier | |
| 7,376,080 B1 | 5/2008 | Riddle | |
| 7,385,924 B1 | 6/2008 | Riddle | |
| 7,421,487 B1* | 9/2008 | Peterson et al. | 709/223 |
| 7,600,036 B2* | 10/2009 | Hesselink et al. | 709/234 |
| 8,082,324 B2* | 12/2011 | Lin et al. | 709/218 |
| 2002/0129271 A1* | 9/2002 | Stanaway et al. | 713/201 |
| 2003/0037260 A1* | 2/2003 | Milo | 713/201 |
| 2004/0158744 A1* | 8/2004 | Deng et al. | 713/201 |
| 2005/0213586 A1* | 9/2005 | Cyganski et al. | 370/395.41 |
| 2008/0095066 A1* | 4/2008 | Lee et al. | 370/252 |

OTHER PUBLICATIONS

Roedig, U.; Gortz, M.; Karsten, M.; Steinmetz, R., "RSVP as firewall signalling protocol", Computers and Communications, 2001. Proceedings. Sixth IEEE Symposium on Communication, Networking & Broadcasting ; Computing & Processing (Hardware/Software) ; Signal Processing & Analysis. 2001 , pp. 57-62 [retreived from IEEE database on Jan. 31, 2013.*

Sastri L. Kota, Quality of Service for Broadband Satellite Internet—ATM and IP Services 2002, Oulu University Press.

Office Action in U.S. Appl. No. 11/051,546, Mail Date: Mar. 5, 2008.

* cited by examiner

METHOD AND APPARATUS FOR PERFORMING QUALITY OF SERVICE IN SECURE NETWORKS

RELATED APPLICATIONS

This application claims priority under 35 U.S.C. §119(e) to U.S. Provisional Application Ser. No. 60/930,884, entitled "METHOD AND APPARATUS FOR PERFORMING QUALITY OF SERVICE IN SECURE NETWORKS," filed on May 18, 2007, which is herein incorporated by reference in its entirety.

FIELD OF THE INVENTION

The invention relates generally to communication networks, and more particularly to methods and systems for communicating in secure networks.

BACKGROUND

Conventional forms of secure communication are commonly used to communicate between computer systems. Generally, systems communicate using one or more protocols such as, for example, protocols available in the well-known TCP/IP protocol suite. In some networks, secure communication between two or more computer systems is critical for particular applications to ensure that the information communicated cannot be observed during transmission over the network.

IPsec (IP security) is a standardized framework for securing Internet Protocol (IP) communications by encrypting and/or authenticating each packet in a data stream, which prohibits observation of communications between unauthorized systems. The well-known HAIPE (High Assurance Internet Protocol Encryptor) is based on the IPSec framework and includes additional restrictions and enhancements. Other security protocols (e.g., SSL, TLS) exist that permit the encryption of data packets which are transmitted between computers.

To ensure a quality of service (QOS) relating to the transmission performance of particular protocols, various techniques may be used. For example, the Dynamic Bandwidth Resource Allocation (DBRA) system may be used in a network to resolve quality of service requests from users and for managing bandwidth allocation issues from a central location. However, such schemes may have difficulty being performed in networks having encrypted communications. More particularly, according to one aspect of the present invention, it is appreciated that there may be security issues with having an entity monitor information regarding communications in a secure network. Thus, in some environments where network-layer based security is performed, bandwidth management functions by processes such as DBRA cannot be performed. What is needed, therefore, is a method for permitting such functions to be performed in a secure network.

SUMMARY

As discussed above, it may be beneficial to perform particular functions (e.g., QOS functions) in a secure network without compromising the security of the secure network. In particular, it is appreciated that it may be beneficial to perform QOS functions in a network that implements IPsec without compromising security. In certain types of networks (e.g., satellite-based networks), QoS functions are highly desirable functions that moderate the bandwidth used by connections passing through network nodes. QoS functions are well-known and may include one or more techniques for monitoring traffic and adjusting traffic as necessary to meet overall system goals.

In a network implementing IPsec, there can be one or more secure logic connections between computer systems. These computer systems may be arranged into secure networks referred to as communities of interest (COIs). IPSec includes two protocols: the Authentication Header, or AH protocol, and the Encapsulating Security Payload, or ESP protocol. The AH protocol creates an envelope that provides integrity, data origin authentication and protection against outside attacks such as from replay attacks. The AH protocol authenticates every packet, so session-stealing programs are rendered ineffective. The ESP protocol provides data privacy.

A HAIPE-based network generally includes a secure gateway that allows two systems that process classified information to exchange data over an open network. In one configuration of a HAIPE network, a secure side (referred to as the "red" side) of the communication is used for transmitting data between nodes within the community of interest. Another side of the communication (referred to in the art as the "black" side) is used to transmit information to the unsecured network. One rule that is followed to ensure security in maintained includes prohibiting the unrestricted sending of data from the unsecure (black) to the secure (red) side.

However, according to one aspect of the present invention, it is appreciated that there is a problem with implementing Quality of Service (QoS) functions on such a secure network (e.g., an IPsec-based network such as HAIPE). For instance, one problem with implementing QoS functions in an IPsec-based network includes the fact that packet header information is encrypted (e.g., TCP header information). Thus, QoS performance cannot be measured without accessing the unencrypted form of the packet. Thus, a system performing particular QoS functions need access to red side communications, thus reducing security. Further, it is appreciated that there is a restriction in communication back to a sending node within a secure community of interest, and therefore, there are issues with implementing QoS services outside of the secure network where it may be required to send information from an insecure network to a secure network.

In the case of implementing the DBRA (Dynamic Bandwidth Resource Allocation) protocol for establishing QoS between systems, there are systems in DBRA that need to monitor channels to resolve QoS requests from a central location. There is a problem with implementing DBRA in a HAIPE-based network in that direct communication between black side and red side networks cannot be allowed. IP-ABR, however, requires direct logical connection between systems, but unfortunately, the use of IPsec for secure communications introduces a barrier between the proxies and the DBRA system which cannot be breached without compromising security.

According to one aspect of the present invention, a method for performing quality of service function in a secure communication network comprising at least one computer system is provided. The method comprises acts of determining a bandwidth allocation for the at least one computer system, communicating control information across a security barrier, the control information being indicative of the determined bandwidth allocation, and using the control information to modify communication behavior of the at least one computer system. According to one embodiment of the present invention, the at least one computer system is located within a secure network, and the act of communicating control information across a security barrier includes an act of communicating the control information across the security barrier to the secure network. According to another embodiment of the invention, the act of communicating control information further comprises an act of communicating the control information to the at least one computer system.

According to another embodiment of the invention, the act of communicating control information further comprises an act of communicating the control information to a proxy system. According to another embodiment of the invention, the act of communicating control information further comprises an act of communicating the control information by the proxy system to the at least one computer system. According to another embodiment of the invention, the act of communicating control information further comprises an act of communicating the control information by modulating a flow of packets across the security barrier. According to another embodiment of the invention, the act of communicating control information further comprises an act of modulating an order of packets communicated across the security barrier. According to another embodiment of the invention, the act of communicating control information further comprises an act of receiving the modulated order of packets within the secure network.

According to one embodiment of the present invention, the method further comprises an act of determining the control information in response to the modulated order of packets. According to another embodiment of the invention, the act of communicating control information further comprises an act of communicating the control information by including the control information within packets that are transmitted across the security barrier. According to another embodiment of the invention, the act of communicating control information further comprises an act of communicating the control information by sending the control information within a secure channel established across the security barrier. According to another embodiment of the invention, the act of communicating control information further comprises an act of communicating the control information by dropping packets in a pattern that includes the control information. According to another embodiment of the invention, the act of communicating control information further comprises an act of communicating the control information by changing congestion notification bits a pattern that includes the control information. According to another embodiment of the invention, the act of using the control information to modify communication behavior of the at least one computer system comprises an act of setting a window value in a memory of the at least one computer system.

According to one embodiment of the present invention, the method further comprises an act of monitoring network performance of a community of interest (COI). According to another embodiment of the invention, the method further comprises an act of monitoring network performance of the at least one computer system. According to another embodiment of the invention, the act of determining a bandwidth allocation for the at least one computer system is responsive to the act of monitoring network performance of the at least one computer system. According to another embodiment of the invention, the secure network includes a secure network implementing IP security (IPsec). According to another embodiment of the invention, the secure network includes a secure network implementing High Assurance Internet Protocol Encryptor (HAIPE). According to another embodiment of the invention, the act of determining a bandwidth allocation includes an act of determining an allocation of TCP bandwidth. According to another embodiment of the invention, the quality of service function includes Internet Protocol Available Bit Rate (IP-ABR). According to another embodiment of the invention, the act of determining a bandwidth allocation for the at least one computer system is performed by a Dynamic Bandwidth Resource Allocation (DBRA) system.

According to one aspect of the present invention, a system for performing quality of service functions in a secure network comprising at least one computer system is provided. The system comprises a controller adapted to determine a bandwidth allocation for the at least one computer system, and a proxy system adapted to communicate control information across a security barrier, the control information being indicative of the determined bandwidth allocation, wherein the at least one computer system is responsive to the control information to modify its communication behavior. According to one embodiment of the present invention, the at least one computer system is located within a secure network, and wherein the proxy system is configured to communicate the control information across the security barrier into the secure network. According to another embodiment of the invention, the proxy system is configured to communicate the control information directly to at least one computer system. According to another embodiment of the invention, the proxy system is configured to communicate the control information to another proxy system located in the secure network. According to another embodiment of the invention, the another proxy system is adapted to communicate the control information to the at least one computer system. According to another embodiment of the invention, the proxy system is adapted to communicate the control information by modulating a flow of packets across the security barrier. According to another embodiment of the invention, the proxy system is adapted to modulate an order of packets communicated across the security barrier. According to another embodiment of the invention, the at least one computer system is adapted to receive the modulated order of packets within the secure network.

According to one embodiment of the present invention, the proxy system is configured to communicate the control information to another proxy system located in the secure network, and wherein the another proxy system is configured to receive the modulated order of packets within the secure network. According to another embodiment of the invention, the another proxy system is configured to communicate the control information to at least one computer system. According to another embodiment of the invention, the another proxy system is adapted to determine the control information in response to the modulated order of packets. According to another embodiment of the invention, the proxy system is adapted to communicate the control information by including the control information within packets that are transmitted across the security barrier. According to another embodiment of the invention, the proxy system is adapted to communicate the control information by sending the control information within a secure channel established across the security barrier. According to another embodiment of the invention, the proxy system is adapted to communicate the control information by dropping packets in a pattern that includes the control information. According to another embodiment of the invention, the controller includes a Dynamic Bandwidth Resource Allocation (DBRA) system. According to another embodiment of the invention, the secure network includes a secure network implementing IP security (IPsec). According to another embodiment of the invention, the secure network includes a secure network implementing High Assurance Internet Protocol Encryptor (HAIPE). According to another embodiment of the invention, the controller is adapted to determine an allocation of TCP bandwidth.

According to one aspect of the present invention, a computer-readable medium encoded with instructions for execution on a computer system, the instructions when executed, performing a method for performing quality of service function in a secure communication network comprising at least one computer system is provided. The method comprises acts of determining a bandwidth allocation for the at least one computer system, communicating control information across a security barrier, the control information being indicative of the determined bandwidth allocation, and using the control information to modify communication behavior of the at least one computer system. According to one embodiment of the present invention, the at least one computer system is located within a secure network, and the act of communicating control information across a security barrier includes an act of communicating the control information across the security barrier to the secure network. According to another embodiment of the invention, the act of communicating control information further comprises an act of communicating the control information to the at least one computer system. According to another embodiment of the invention, the act of communicating control information further comprises an act of communicating the control information to a proxy system. According to another embodiment of the invention, the act of communicating control information further comprises an act of communicating the control information by the proxy system to the at least one computer system. According to another embodiment of the invention, the act of communicating control information further comprises an act of communicating the control information by modulating a flow of packets across the security barrier.

According to one embodiment of the present invention, the act of communicating control information further comprises an act of modulating an order of packets communicated across the security barrier. According to another embodiment of the invention, the act of communicating control information further comprises an act of receiving the modulated order of packets within the secure network. According to another embodiment of the invention, the method further comprises an act of determining the control information in response to the modulated order of packets. According to another embodiment of the invention, the act of communicating control information further comprises an act of communicating the control information by including the control information within packets that are transmitted across the security barrier. According to another embodiment of the invention, the act of communicating control information further comprises an act of communicating the control information by sending the control information within a secure channel established across the security barrier.

According to another embodiment of the invention, the act of communicating control information further comprises an act of communicating the control information by dropping packets in a pattern that includes the control information. According to another embodiment of the invention, the act of communicating control information further comprises an act of communicating the control information by changing congestion notification bits a pattern that includes the control information. According to another embodiment of the invention, the act of using the control information to modify communication behavior of the at least one computer system comprises an act of setting a window value in a memory of the at least one computer system.

According to one embodiment of the present invention, the method further comprises an act of monitoring network performance of a community of interest (COI). According to another embodiment of the invention, the computer-readable medium further comprises an act of monitoring network performance of the at least one computer system. According to another embodiment of the invention, the act of determining a bandwidth allocation for the at least one computer system is responsive to the act of monitoring network performance of the at least one computer system. According to another embodiment of the invention, the secure network includes a secure network implementing IP security (IPsec). According to another embodiment of the invention, the secure network includes a secure network implementing High Assurance Internet Protocol Encryptor (HAIPE). According to another embodiment of the invention, the act of determining a bandwidth allocation includes an act of determining an allocation of TCP bandwidth. According to another embodiment of the invention, the quality of service function includes Internet Protocol Available Bit Rate (IP-ABR). According to yet another embodiment of the invention, the act of determining a bandwidth allocation for the at least one computer system is performed by a Dynamic Bandwidth Resource Allocation (DBRA) system.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a chart of TCP performance with IP-ABR on;

DETAILED DESCRIPTION

Figure 1:
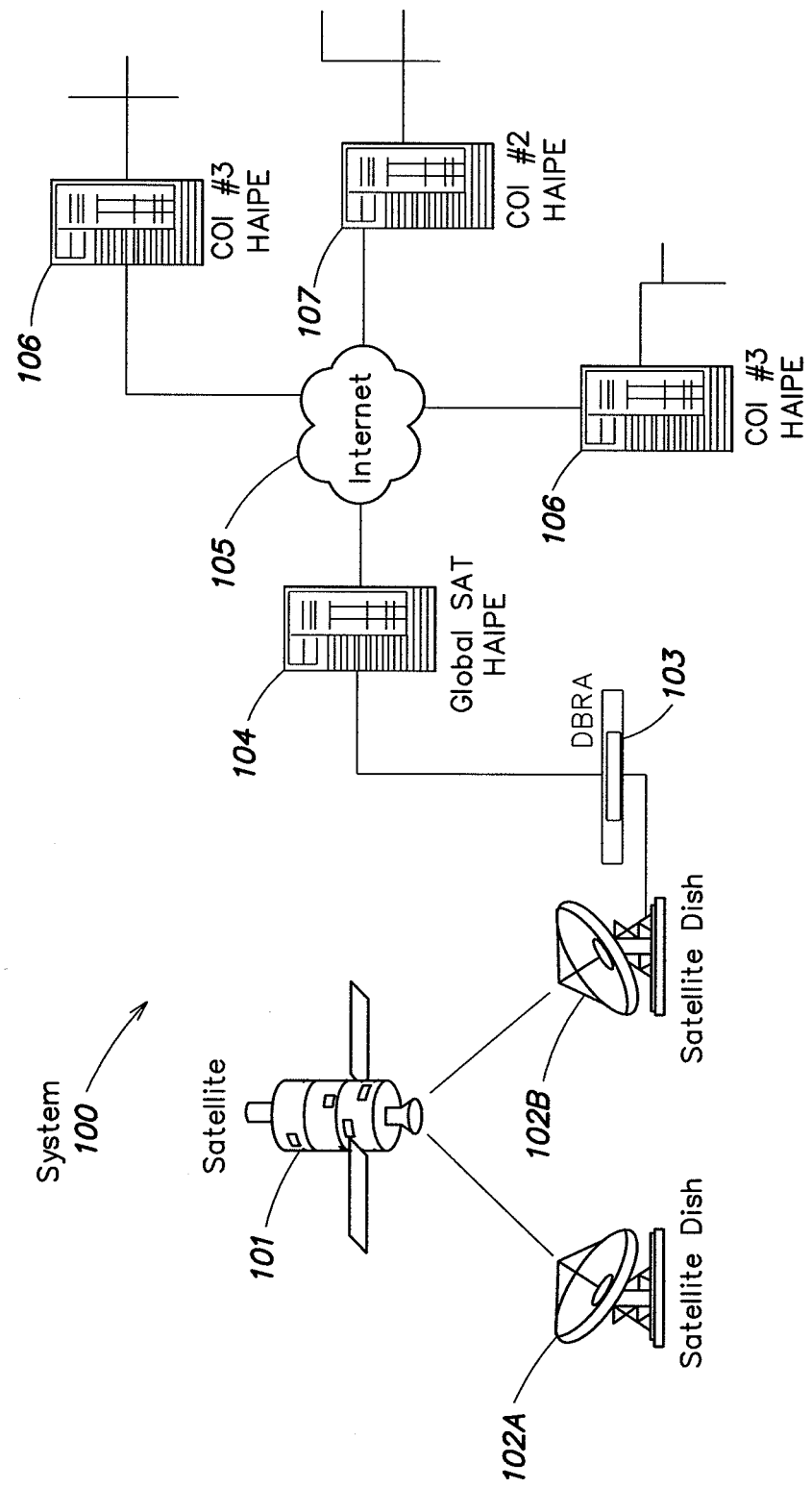
FIG. 1 is a block diagram of a network communication system in which various aspects of the present invention may be implemented.

The following examples illustrate certain aspects of the present invention. It should be appreciated that although these examples are provided to illustrate certain aspects of the present invention, the invention is not limited to the examples shown. Further, it should be appreciated that one or more aspects may be implemented independent from any other aspect. This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Establishing and maintaining Internet connections with specific Quality of Service (QoS) guarantees is generally challenging, but is especially so given low bandwidth, high latency and variable rate channels such as those found on satellite links. In conventional communication networks such as the Internet, there are demonstrated methods for dynamically assigning and regulating bandwidth utilization via proxy servers by manipulation of basic TCP parameters. Such methods include, for example, Dynamic Bandwidth Resource Allocation (DBRA). DBRA systems manage such proxy servers by monitoring satellite channels and resolving QoS requests centrally. It is appreciated that the use of IPsec for secure communications introduces a barrier between proxies and the DBRA system which cannot be breached without compromising security. It would be beneficial to achieve communication without a full reconstruction of the secure network topology.

According to one aspect of the present invention, a method is provided for permitting proxy servers to communicate within full DBRA schemes without compromising security.

According to various embodiments, methods for IPsec communication are provided that permit systems to move information across secure gateways. In one embodiment, IPsec communication and full DBRA bandwidth/QoS control is provided without compromising security. Although various aspects of the present invention relate to satellite networks, it should be appreciated that aspects relate to other types of secure networks, and the present invention is not limited thereto.

FIG. 1 shows an example communication system 100 in which various aspects of the present invention may be practiced. System 100 may include, for example, one or more communities of interest (COIs) connected by a distributed network (e.g., by the Internet 105 and/or other type of network). In one such network, there may be one or more COIs connected by a satellite network including one or more satellites (e.g., satellite 101) and satellite receivers (e.g., satellite dishes 102A-102B). To increase protocol performance (e.g., TCP performance), network system 100 may include one or more controllers (e.g., DBRA system 103) that is capable of monitoring performance of one or more networks and controlling performance of network systems. To this end, network system 100 may include one or more HAIPE systems within particular communities of interest (e.g., HAIPE systems 104, 106, and 107). Further, system 100 may include a global network HAIPE system (e.g., global satellite HAIPE 104) that monitors and controls one or more of the systems connected by the satellite network. As discussed, there is a problem with such systems, as there is a basic requirement of such a controller to be able to communicate control information to the systems which are being controlled, but such systems are located in secure networks, and communication with such system may compromise security of such networks. To this end, a method is provided for enabling control of systems located in secure networks.

To understand the various elements involved, a discussion of various related technologies is provided below. Although such discussions relate to TCP performance and specific methods for ensuring TCP performance, it should appreciate that the invention is not limited thereto unless specified in the claims.

IP-ABR

It has been shown that plain TCP may be modified to have better performance using IP-ABR, thus providing improved QoS for TCP. In particular, IP-ABR, as discussed more fully below, provides decreased jitter and latency when applied to IP networks, including those on satellite links. However, in encrypted networks, the concealment of TCP header information and the prevention of payload manipulation appears to eliminate any possibility of using the IP-ABR service with such secure networks.

Satellite Channels and DBRA

The benefit of using satellites to transmit information is clearly evident. One can cross connect cities, nations and continents without ever laying a single fiber. Transmission over such networks, however, has its price, as large delays, low bandwidth, and at times varying bandwidth, as well as higher than normal error rates are experienced in such networks. In such networks, QoS management is essential.

In one such system, a QoS function moderates all data moving through the satellite on a per-connection basis based on each connection's QoS requirements. As with most satellite networks today, there is a Dynamic Bandwidth Resource Allocation (DBRA) system in place which manages the traffic being handled. The DBRA makes decisions regarding the amount of bandwidth available, broadcasts information about the link, and limitations are then imposed on the users. This DBRA function controls how the line is shared not only between individuals, but among various agencies or networks, or Communities of Interest (COIs) as they are commonly referred to in the art. In the case of military applications, management of QoS may be taken a step further to provide class-based services for end users. The DBRA function in this case monitors and controls all the COIs, each with multiple users and varying priorities. Further, the DBRA function monitors the state of the satellite itself, and acts accordingly to fluctuations in bandwidth due to weather or other link deficiencies.

IP-ABR Background

The IP-ABR concept derives its name from the Asynchronous Transfer Mode (ATM) protocol, and allows a QOS-oriented service coupled with the flexibility of IP traffic. However, unlike its counterpart, IP-ABR is not a protocol, but rather is a service addition to the existing TCP protocol.

TCP protocol, despite being known for its aggressive behavior, provides a way to control data rates in its flows. The receiver can constantly manage data coming in by allowing the sender a specified number of bytes before the sender can be allowed to send again. This is performed by returning a "window" value of allowed sequence numbers with every Acknowledgement (ACK) packet. IP-ABR takes advantage of this by constantly modifying the window value on return packets in such a way so as to limit the amount of data sent to match a pre-set bandwidth requirement. The result is measurably lower jitter and latency, at the cost of some form of central traffic management. However, despite this additional management overhead, the advantages are numerous. For example, per-flow bandwidth allocation for class-based traffic is provided and steady bandwidth is provided for constant bit rate (CBR) sources like Voice over IP (VoIP) and streaming video.

Figure 2:
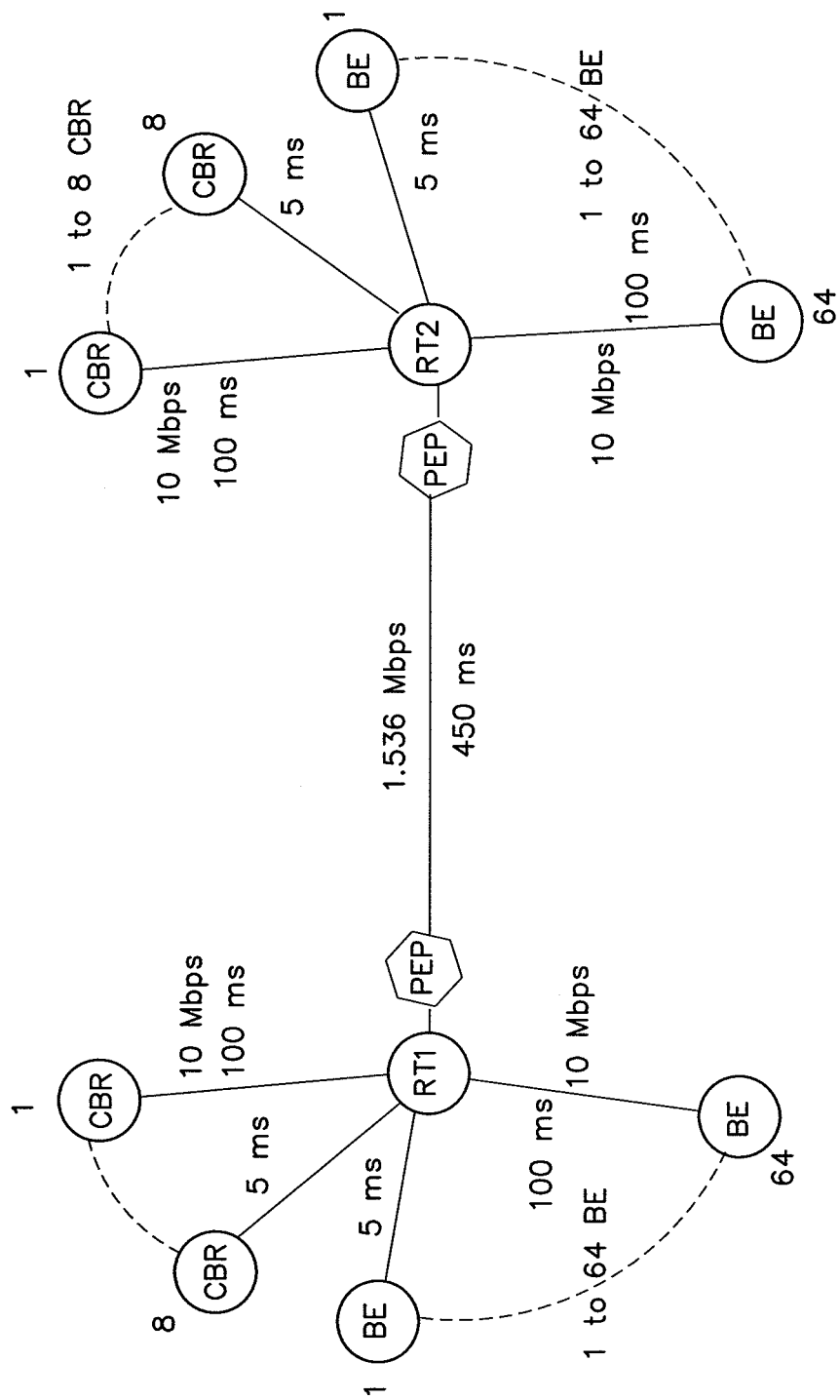
FIG. 2 is a IP-ABR simulation landscape.

FIG. 2 shows an IP-ABR simulation landscape that shows the benefits of IP-ABR. In an IP-ABR system, what is referred to as an IP-ABR Proxy manages all data flows passing through the machine. An implementation of the proxy may include, for example, a management process executing on a router. User commands allow for per-flow and system-wide bandwidth allocation and for remote TCP control of the system.

In conjunction with a DBRA, the proxy could be used to manage how a satellite divides its available bandwidth. By identifying individual flows, the IP-ABR Proxy can easily be used to implement class-based QoS. Also, if not more important, is the ability of IP-ABR to react quickly to changing link conditions. In the case of a rapid reduction in bandwidth, data flows would not need to wait their usual round-trip time (RTT), up to a second or more, to discover something has gone awry. Rather, the proxy or proxies would be immediately informed of the distress and quickly adjust their flows' bandwidths with minimal loss of data or need for retransmission. Furthermore, with use of a preemptive warning of link degradation, the system could avoid loss of data altogether.

Figure 3:
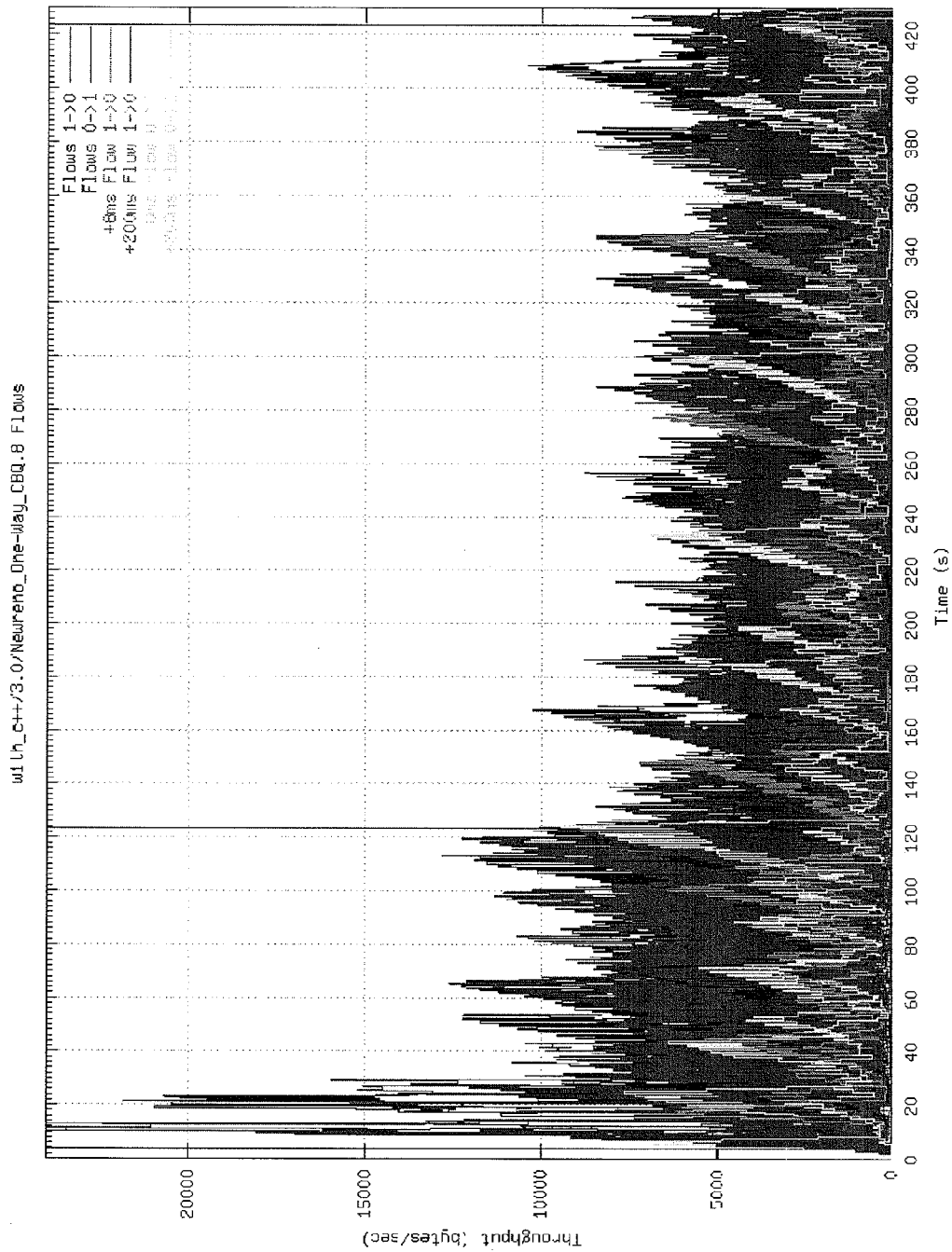
FIG. 3 is a chart of TCP performance with IP-ABR off.
Figure 4:
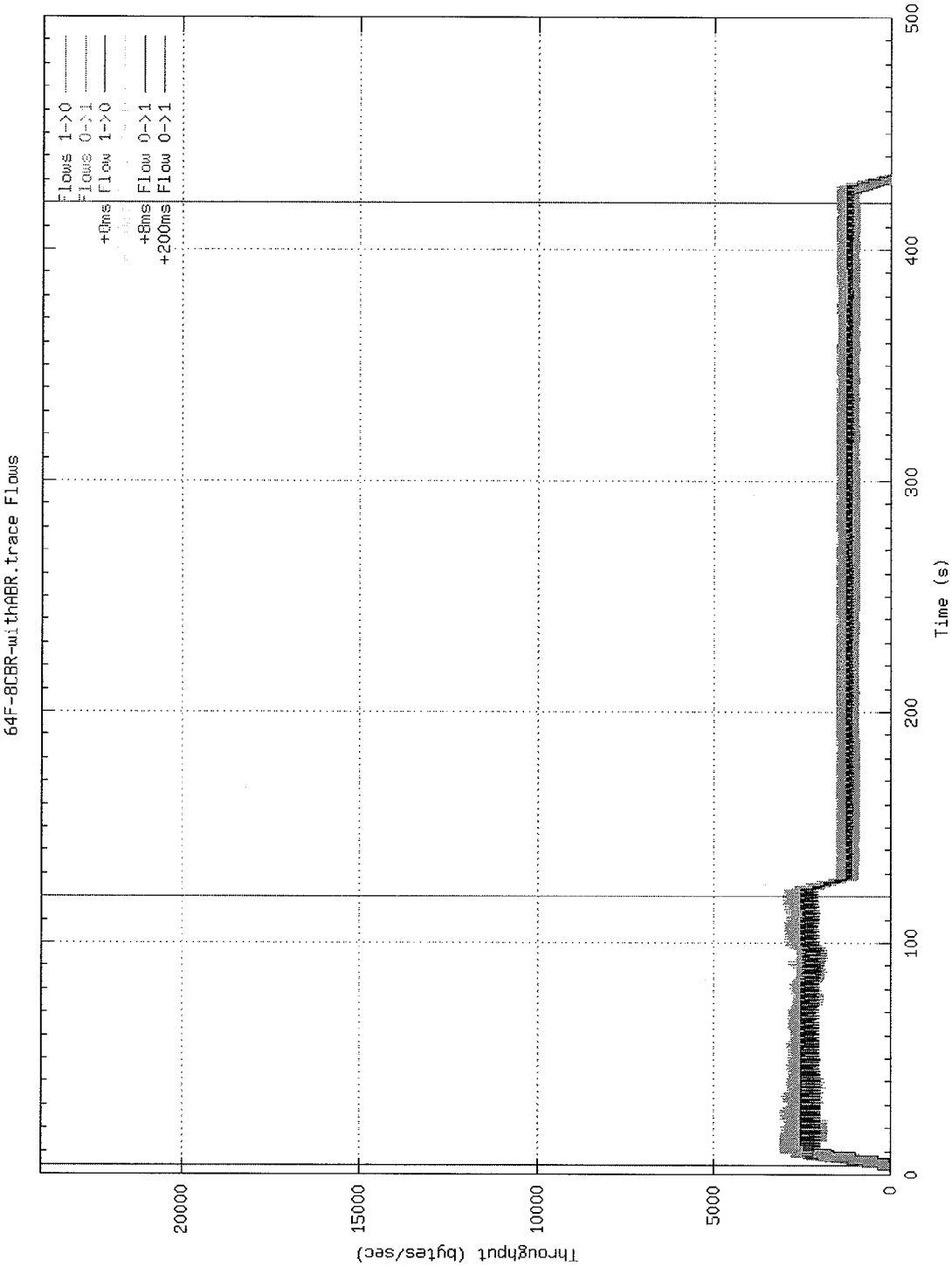

TCP is designed to be at the very least a reliable protocol. The size and volatile nature of the Internet demand a communications system that is not only fast but also self-maintained. However, despite TCP's perseverance to achieve a full data transaction, it will never guarantee a delivery time or a consistent transfer speed. In other words TCP does not assure us of bandwidth, latency or amount of jitter in a connection. IP-ABR on the other hand provides these services, while keeping TCP's other beneficial features. FIG. 3 shows a characteristic TCP network displays the aggressive behavior of the bare protocol. In the case of a satellite link with known bandwidth and topography, the need for TCP flows to aggressively compete is unnecessary. FIG. 4 shows the same network under the control of IP-ABR. As a result, the full available bandwidth is now utilized completely. Using this method there is barely cause for packets to be lost and retransmitted. Even at the 2 minute mark when the available bandwidth is halved from 1.5 Mbps to 750 Kbps the flows are simply throttled down without any need for data loss or TCP repair.

IPsec

IPsec, shorthand for Internet Protocol security, has evolved into a complete and yet simple solution for providing protection in a variety of network topologies. Where other methods have been limited by focusing on the application layer or the enduser, IPSec has been designed to encompass all data traffic under one umbrella protocol. Because IPSec operates at the Internet layer, the IP protocol itself becomes secure. An IPsec protected network is one in which all data packets (and possibly control packets) are monitored and/or are encrypted to protect them from various threats such as packet sniffing or modification. Various other aspects of the data flows are also monitored to prevent such common attacks as Denial of Service (DoS), replay and spoofing.

However, because of the amount of overhead that this level of protection requires, IPsec is divided into at least three independent security schemes which need to be understood. IPsec operates in two different modes: transport mode and tunnel mode. Transport mode is used for a secure host-to-host connection. In tunnel mode, a whole network of users is secured by piping their connections through a single gateway. Assuming the desire of implementing security in large scale networks, the following discussion applies to tunnel mode, however it should be appreciated that other secure communication methods may be used, and the invention is not limited to any particular method unless specifically recited in the claims.

The Authentication Header (AH) provides several security features. The AH requires attaching a special header to every IP packet with specific information that is later used to certify the packet's legitimacy. Table I below shows a template for an AH design. Three parameters therein provide most of the security. First, the Security Parameter Index (SPI) indicates how the security of this packet is established. The SPI affiliates the packet with a preset Security Association (SA) between two hosts or two networks in one direction communication.

TABLE I

| Authentication Header Format | | |
| --- | --- | --- |
| 8 bits | 16 bits | 32 bits |
| Next Header | Payload Length | Reserved |
| Security parameters index (SPI) | | |
| Sequence Number Field | | |
| Authentication data (variable length) | | |

An SA could indicate, for example, what kind of traffic is allowed through a secure channel, or how long a secure alliance between the two hosts will last. The sequence number represents the number of sent packets using the current SA, and the sequence number provides the information necessary to detect a DoS or replay attack. At any given point in a data transmission, a secure receiver will only expect packets having sequence numbers falling inside a small window centered around the last successful one received, allowing for the fact that packets may be shuffled by the network since they left the sender. This creates a sliding window of acceptable packets, outside of which any packets are dropped. The real strength behind AH is the authentication data itself. This variable length field includes an encrypted payload which is used to verify the integrity of the data itself. It should be noted that the data itself is plaintext, and the data could be read by anyone in the path of the flow. However, any modifications to the data would be detected and the packet instantly dropped. The original IP header is also authenticated, which verifies the users involved in the connection, as well as the AH itself to protect the unencrypted fields.

AH by itself offers protection, but not confidentiality. The Encapsulating Security Payload (ESP) instead provides the assuredness of full encryption. In this case, the full data packet is scrambled in such a way that it can only be read by the intended recipient. When in IPsec tunnel mode, the original IP header is also included in this encrypted payload such that the identity of the end users is hidden as well.

TABLE II

The ESP Header Format.

| 16 bits | 24 bits | 32 bits |
|---------|---------|---------|
| | Security parameters index (SPI) | |
| | Sequence Number | |
| | Payload Data (variable length) | |
| | Padding from 0 to 255 bytes (optional) | |
| | Pad Length | Next Header |
| | Authentication data (optional) | |

The packet may be further secured by optional padding which can be used to mislead any analysis based on packet size. The rest of the ESP header parameters shown above in Table II appear similar to the Authentication Header discussed above. In a high security design, encryption and authentication may be enabled and the combined result is a modified version of the ESP header with the inclusion of the Authentication data field. In this case, authentication occurs over the full encrypted packet, as well as all headers.

Internet Security Association & Key Management Protocol (ISAKMP)

With the availability of both the AH and ESP, a very strong framework for security is available for use with IP packets. However, there still remains a need to establish a Security Association between two independent networks. If one host is unsure of the legitimacy of the other, even infinitely strong encryption will not result in complete security. A system needs to be in place to negotiate secret keys securely between hosts before any communication can exist. The Internet Security Association and Key Management Protocol (ISAKMP) as defined by the IETF defines ground rules for such a system. ISAKMP begins with some assumption that the connecting hosts know a little about themselves. At the very least, there needs to be some peer authentication based on some known piece of information. This may be, for example, either be a pre-shared key that has (by some other method) been discussed between the two hosts, or more likely by a public key exchange Establishing a basic level of communication is called Phase 1. Having confirmed the authenticity of each other the two hosts create a shared secret and establish an ISAKMP Security Association (ISAKMP-SA). An ISAKMP-SA delineates a way to communicate securely, by using mutually decided parameters such as encryption methods and timeout periods. Once again if the parameters do not match, then there is a breach of trust and communication is dropped. Through the ISAKMP-SA a Phase 2 level agreement can then be established. On a Phase 2 communication, new secret keys are created for each IPsec Security Association (IPsec-SA). These are now used as agreements to pass data from specific points in the secure network (not necessarily the host establishing the secure tunnel) to other hosts on the other side. Each connection has its own keys and particular security parameters by which they need to comply.

The DBRA and IPsec Conflict

In a traditional IP-ABR Proxy configuration, the system that performs DBRA management (herein referred to as the "DBRA") sits at the satellite base where the system can directly monitor the channel The DBRA needs to communicate instructions to the proxy regarding the channel status and bandwidth distributions. The proxy is typically placed immediately adjacent to the DBRA, though its physical placement is irrelevant. The logical placement however has twofold importance: first the proxy needs interconnectivity to the DBRA to receive its instructions, and secondly, the proxy needs to be in the path of the TCP flows to be able to manipulate their bandwidth. Our problem arises when this logical arrangement cannot be maintained. In the case of typical military networks, for example, the system configuration may need to be rearranged. Because of security concerns in these types of networks, a clear distinction is made between a secure and an unsecured network. The effect is a deviation in ordinary network topology. In the simplest of cases, the Internet in its entirety can be thought of as unsecured while individual networks, each protected by an IPsec gateway, exist within the Internet as enclosed secure areas.

As referred to herein, the unsecured parts of the network are referred to as the "black" side and the secured areas as the "red" side. Anytime the red side interacts with the black side, there is an IPsec gateway positioned between them to protect the secure information.

Figure 5:
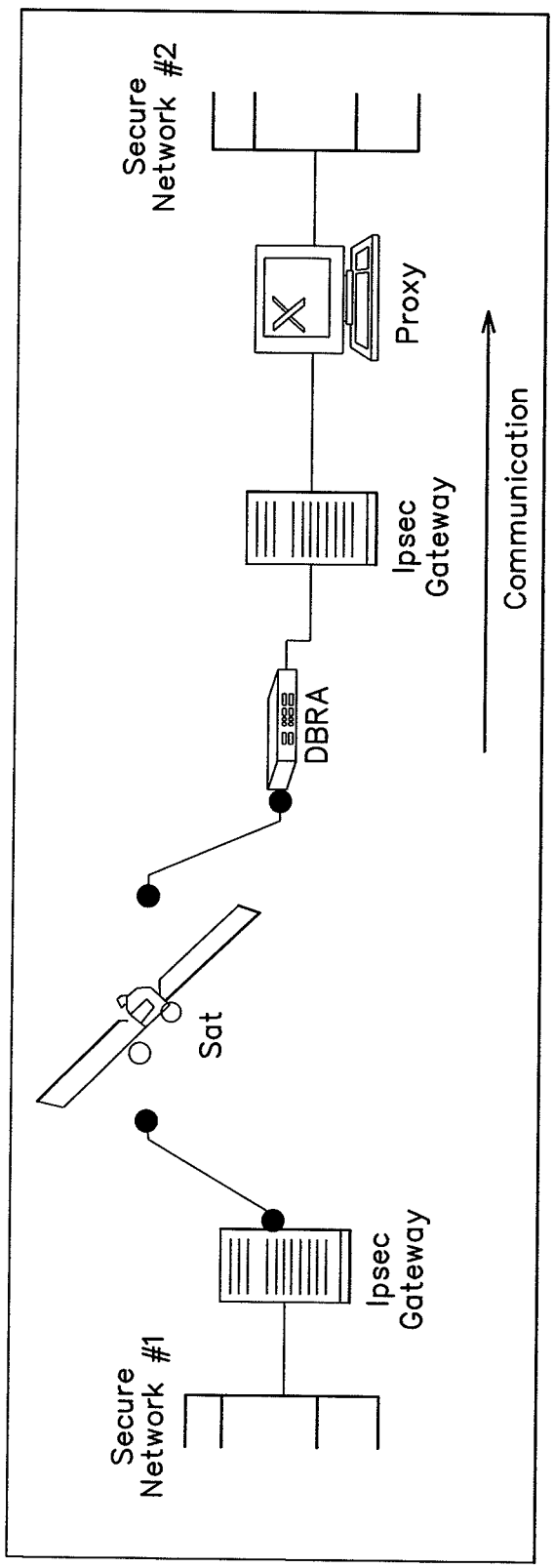
FIG. 5 is a block diagram of a conventional system that prohibits black to red communication.
Figure 6:
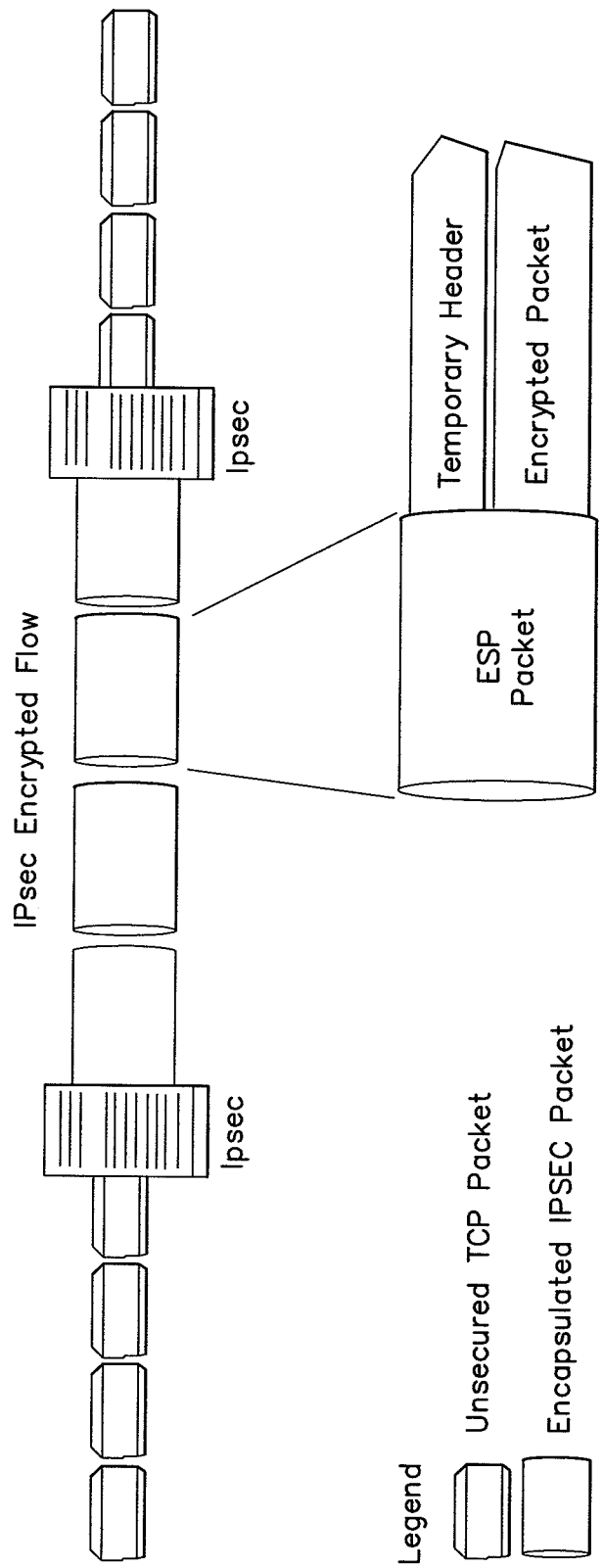
FIG. 6 is a block diagram showing conventional IPsec communications.

As shown in FIG. 5, communication from black to red networks is prohibited. Further, any red networks communicating over a black network will be enclosed in full IPsec encryption and any data passing will be illegible with the exception of a temporary header as shown in FIG. 6. This temporary header contains only enough information to move the packet from the source gateway to the destination gateway. This header is then completely removed before reaching the end recipient.

As shown in FIG. 6, black and red labels (shown in gray) are used to refer to security divisions. As discussed above with respect to IPsec, several levels of information protection may be employed, however a worst-case scenario may be assumed wherein full confidentiality is used. In the black side, packets originating from a red network are always secured (e.g., encrypted). If a black transmission line was observed, one would see a stream of semi-readable packets (the IPsec header is still plaintext) moving between secure networks.

These packets would correspond to an innumerable number of flows, all indistinguishable from each other and almost completely immutable. This means that the IP-ABR Proxy may no longer be used in any of the black regions, as the proxy would be incapable of examining and/or modifying any data, including the window parameters needed to restrict bandwidth. Despite the fact that the DBRA needs to remain next to the satellite, it follows that the proxy needs to be placed inside each red network to control the TCP flows. This requirement changes the expected topology drastically and inserts a wall, that is the IPsec gateway, between the DBRA and the proxy. However, it is appreciated that there is a problem with communicating across this wall.

Example Methods

According to one aspect of the present invention, an information channel may be used to communicate control information between the DBRA and proxy systems that are permitted by IPsec. In this way, the full benefits of IPsec security are available as well as an added functionality of controlled black to red communication. Many different methods for communicating information from the black side to the red side may be used, including, but not limited to directly transmitting data, piggybacking of data in available TCP or IP packet fields, directly and/or indirectly passing information through the modulation of packets in existing flows, and other communication methods.

One approach may include making the satellite a member of the red networks. The satellite would have its own IPsec gateways and the proxy could again be set adjacent to the DBRA, or at least it could communicate over secured TCP with another red network. This is not a desirable approach, as the satellite channel is a shared element, each of which has some form of established security, the 'satellite network' would become a single point of failure for security. Each of these Communities of Interest (COIs) holds a secret key with which it talks to other member of its COI.

Furthermore, each of the COIs also have their own hierarchies of security wherein they might have hundreds of separate security sub-levels and keys. The single IPsec gateway at the satellite would need to hold a copy of every secret key required to unencrypt all flows from all levels. A breach in the security of the satellite would mean access to all secure levels in all COIs. This assumes that the satellite and DBRA constitute a secure network of their own, however, it should not be considered as secure as the red networks, as the satellite itself lacks the physical defenses of its counterpart networks on the ground. Thus, there are security concerns involved with making the satellite network a shared element.

Figure 7:
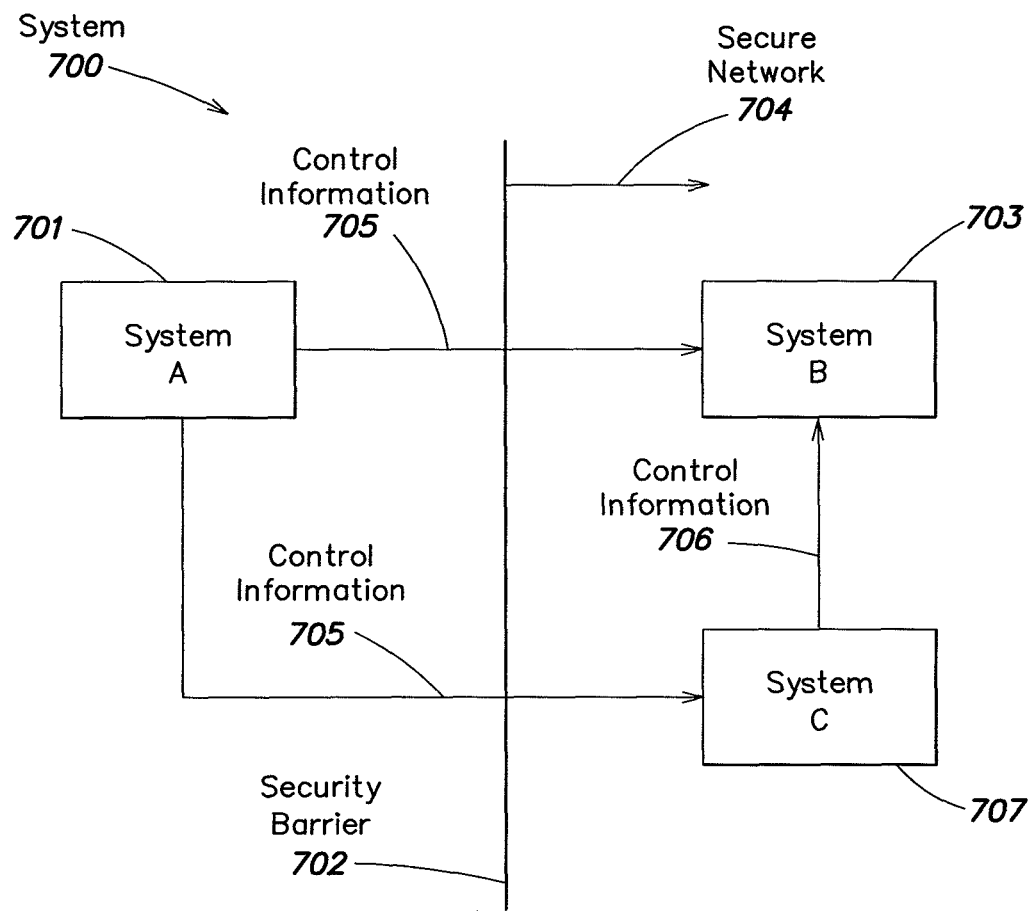
FIG. 7 is a block diagram of a system for performing quality of service according to one embodiment of the present invention.

According to one aspect of the present invention, it is realized that there are problems with implementing QoS functions in a secure network. FIG. 7 shows one embodiment of a system 700 incorporating various aspects of the invention for performing QoS functions in a secure network. In particular, system 700 includes a system (e.g., system A (item 701)) that performs QoS functions, congestion avoidance or other network transport control function used for ensuring the quality of communications within network 700.

System 701 may perform one or more monitoring functions (e.g., bandwidth monitoring) or other QoS evaluation of the performance of the overall communication network or parts thereof. To this end, system 701 may, as part of its management function, need to communicate to one or more systems. For instance, system 701 may need to send control information 705 to another system (e.g., system B (item 703)) that communicates within system 700 and uses system 700 resources. In one example, control information may include an indication of an available bandwidth that system 703 can use within network 700. However, it should be appreciated that control information 706 may be any control information necessary for performing a closed loop control of a QoS function.

In one embodiment of the present invention, the control information 705 may be communicated directly to the system being managed (e.g., system 703). That is, system 703 may be capable of communicating directly with a manager system using a protocol. As discussed above, according to one aspect of the present invention, a protocol is provided for communicating control information across a security barrier 702. Such a barrier may include, for example, a gateway to a secure network 704 (e.g., a secure gateway in a HAIPE-based network) in which system 703 is located.

In other embodiments of the present invention, one or more other systems may be employed to communicate the control information to the end system being controlled. For instance, system 700 may include a system (e.g., system C (item 707)) located within the secure network 704 that receives the control information 705 communicated using the communication protocol. As discussed, the information may be communicated across barrier 702 using one or more methods, including but not limited to, directly transmitting data, piggybacking of data in available TCP or IP packet fields, directly and/or indirectly passing information through the modulation of packets in existing flows, and other communication methods.

There may be one or more systems located outside of the secure network that are capable of transmitting control information. In one particular case, a system is located logically near to a secure gateway so as to ensure proper communication of control information to one or more systems located on the secure side of the gateway. According to one specific example, packet order modulation is performed on packets destined for the secure network 704. To this end, a system (e.g., system 701) receives such packets, and reorders the packets, and transmits them to the secure network 704. Because some reordering of packets are permitted by the secure gateway, the reordered packets are permitted to flow unchanged to the secure side of the network.

According to one embodiment of the invention, there is a dedicated system that receives the packets inside the secure network and extracts the control information communicated from outside the secure network. This extracted information may then be communicated to the end system (e.g., system 703) as control information (e.g., information 706).

Figure 8:
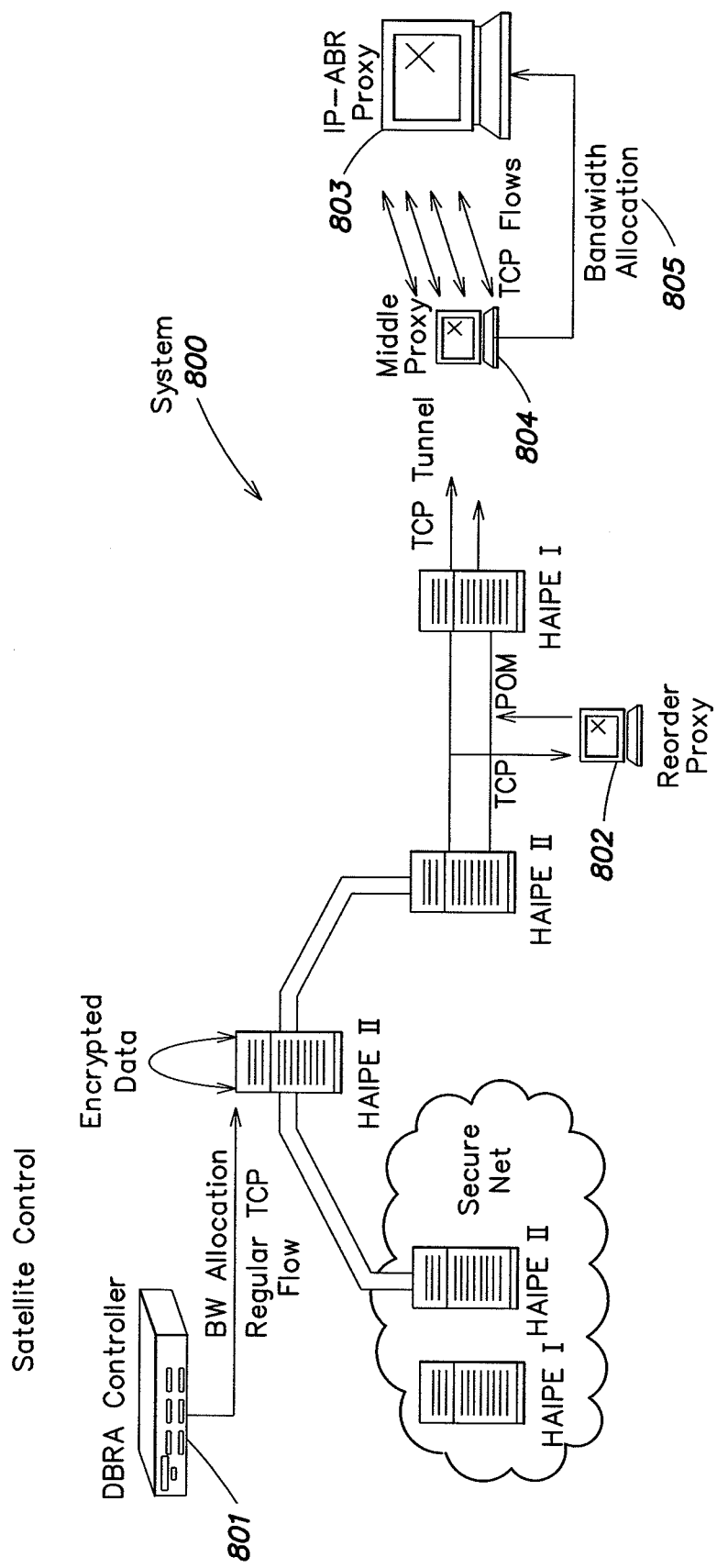
FIG. 8 is a block diagram of an example system for performing quality of service according to one embodiment of the present invention.

FIG. 8 shows an example network system 800 implementing various aspects of the present invention. In one such network, there may exist a controller system (e.g., DBRA controller 801) that performs QoS functions between systems, there are systems in DBRA that need to monitor channels to resolve QoS requests from a central location (e.g., in a satellite network). In one embodiment, the DBRA controller may communicate information to a reorder proxy 802 which reorders packets destined for a secure network having an IP-ABR proxy 803. The reorder proxy encodes the control information into the order of packets destined for the secure side network, which are passed unchanged by the secure gateway. According to one embodiment, the secure side includes a middle proxy 804 which is configured to detect the reordered packets and extract the encoded control information. The extracted control information is passed on to the IP-ABR proxy 803 as a bandwidth allocation or other control information. Although packet order modulation can be used to communicate control information across a secure gateway, it is appreciated that other methods for communicating such information may be used as discussed more fully below.

Figure 9:
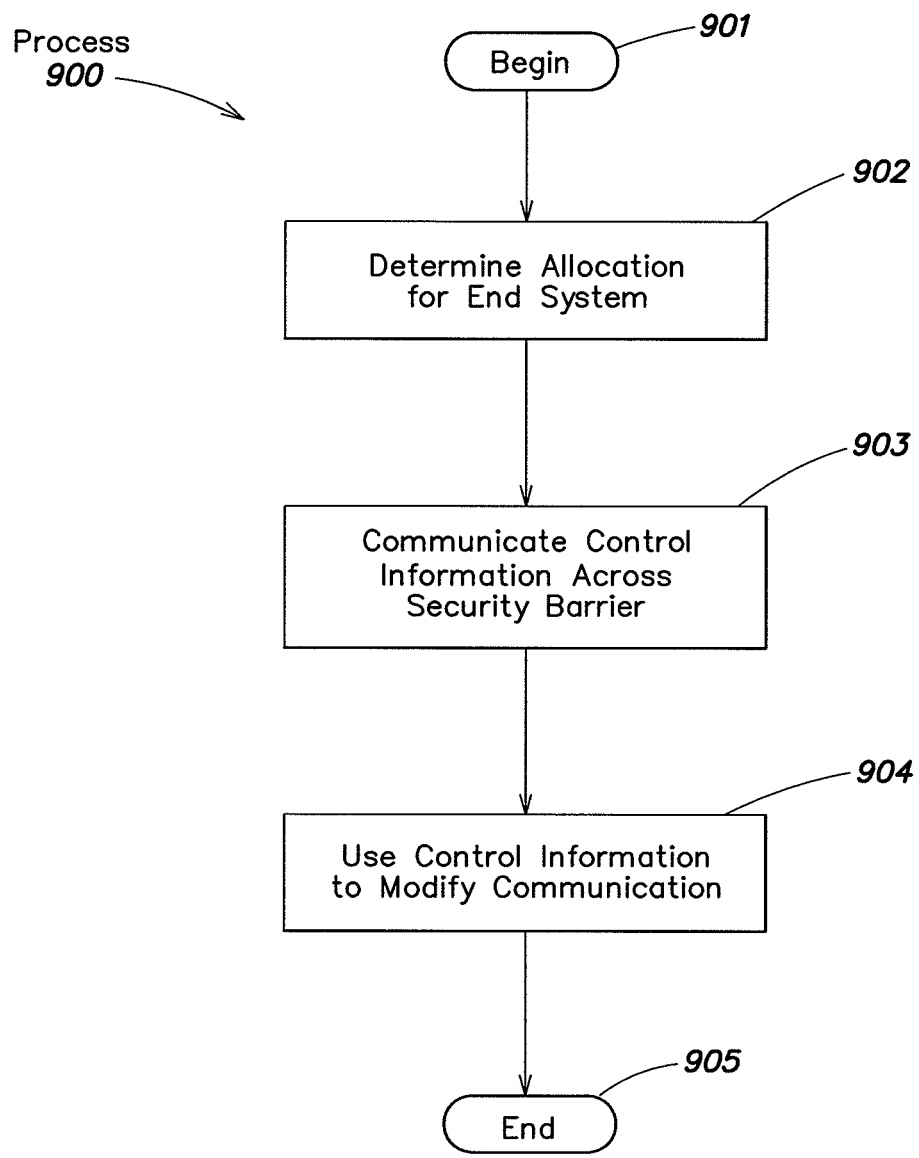
FIG. 9 is a process for performing quality of service in a secure network according to one embodiment of the present invention.

FIG. 9 shows one process 900 for performing quality of service in a secure network according to one embodiment of the present invention. For example, such a process may be performed by one or more computer systems including workstations, networking devices or other systems, management systems or other networking entities, either alone or in combination with other network entities. At block 901, process 900 begins. As discussed, there may be one or more management entities in a network (e.g., networks 700, 800) that are tasked to maintain a Quality of Service (QoS) in the network. To this end, these systems may determine a bandwidth allocation for a particular end system (or node) at block 902 and may need to communicate such allocation to that particular end system. At block 903, the system, either alone or in combination with other systems, communicates the control information across a security barrier into a secure network. A receiver (either the node or other proxy system) is adapted to extract the control information and properly convey the bandwidth allocation to the end node. Thereafter, the end node may use the control information to modify its communication behavior at block 904. At block 905, process 900 ends.

ICMP Piggybacking

Figure 10:
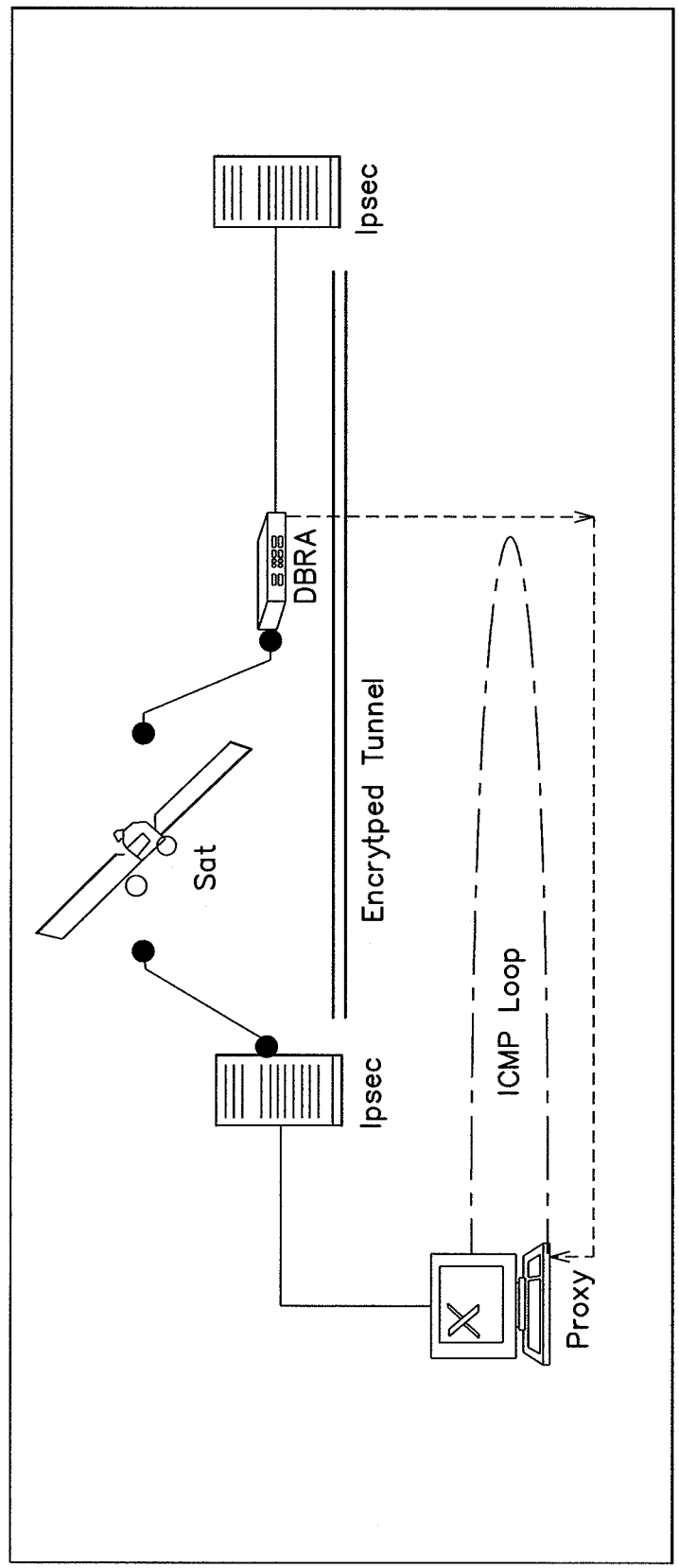
FIG. 10 is a system for piggybacking on ICMP packets.

One method for communicating between networks may include piggybacking data on packets such as, for example, Internet Control Message Protocol (ICMP) packets. ICMP packets are constantly being transmitted through every IP channel attached to a computer or router. According to one embodiment, it is appreciated that IPsec is configurable to allow ICMPs through without applying any security, in order to not interrupt the flow of these control packets. Hence it would then be in keeping with typical IP operations if the DBRA were to send occasional ICMPs to the IP-ABR proxies inside the red networks as shown in FIG. 10.

ICMP messages are sent inside IP datagrams using the standard IP header. According to one embodiment, piggybacking data on an IP packet may be used to transmit control information for a bandwidth management function. RFC 792 indicates that there are currently 40 commonly used control packets and within this set, most packets are messages with no data field. Data can be attached at the header level or even more information can be sent as the data payload for these messages. Despite the utility of control messages on the Internet, it is also the case that the red side, that is the secure network, should never be allowed by a vigilant administrator to communicate with the black side directly. Thus, depending on how well an administrator regulates ICMP traffic, this method of communication may be used. The only ICMPs that really need to be monitored, such as those regarding Internet route configuration, can be handled by the IPsec gateways directly and ICMPs between red sides can just be encrypted within the secure data flows.

Packet Morse Code

Less direct methods of communication may be used to escape the limitations of channels subject to administrative decisions. In one embodiment, Packet Morse Code (PMC) presents a way to send information without explicitly introducing data in the form of new packets. Instead, bits of data may be represented by making patterned drops of packets, similar to the way the Morse code substitutes letters with an interrupted current.

Figure 11:
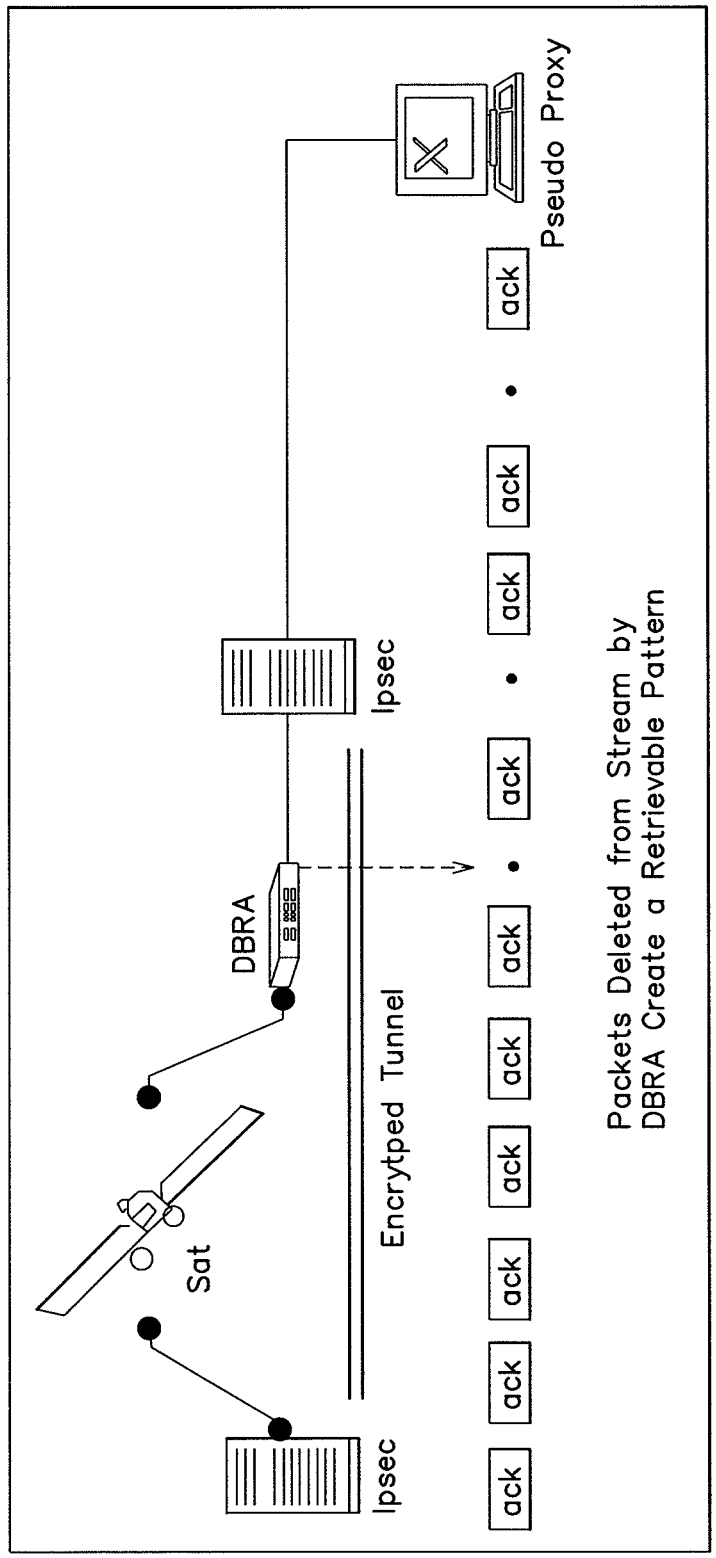
FIG. 11 is a system for marking a packet flow to send a message.

The 'current' here, however, takes the form of a streaming data flow as shown in FIG. 11. Using this approach, the DBRA monitors and moderates a secure stream, that is one flowing from one red network to another. The DBRA would systematically drop packets in the flow in a way that would create a retrievable pattern, such as a number represented in binary wherein the missing packets represent 1s. The untouched portion of the data flow continues to the IPsec gateway, and having the proper SAs, are decrypted and continue to their final destination. The missing packets go unacknowledged by the received and eventually are resent by the sender. This is part of the natural cycle of the TCP protocol.

One advantage of course, is the fact that the slightly mangled flow passes unnoticed through the IPsec gateway. In doing so a "message" is passed from the black network to the red network. The only issue with this technique is that there is a deliberate loss of data. However, the method may be applied to an acknowledgement flow which itself carries no implicit data. Furthermore, the way TCP acknowledgements operate is such that any ACK packets received invalidate previous ACK messages by acknowledging any and all data up to the specified point in the sequence. As long as the patterned drops are occasional and spaced, that is some ACK packets reach the sender within the time alloted by the TCP Retransmission Timeout (RTO), then no data retransmission is necessary.

Figure 12:
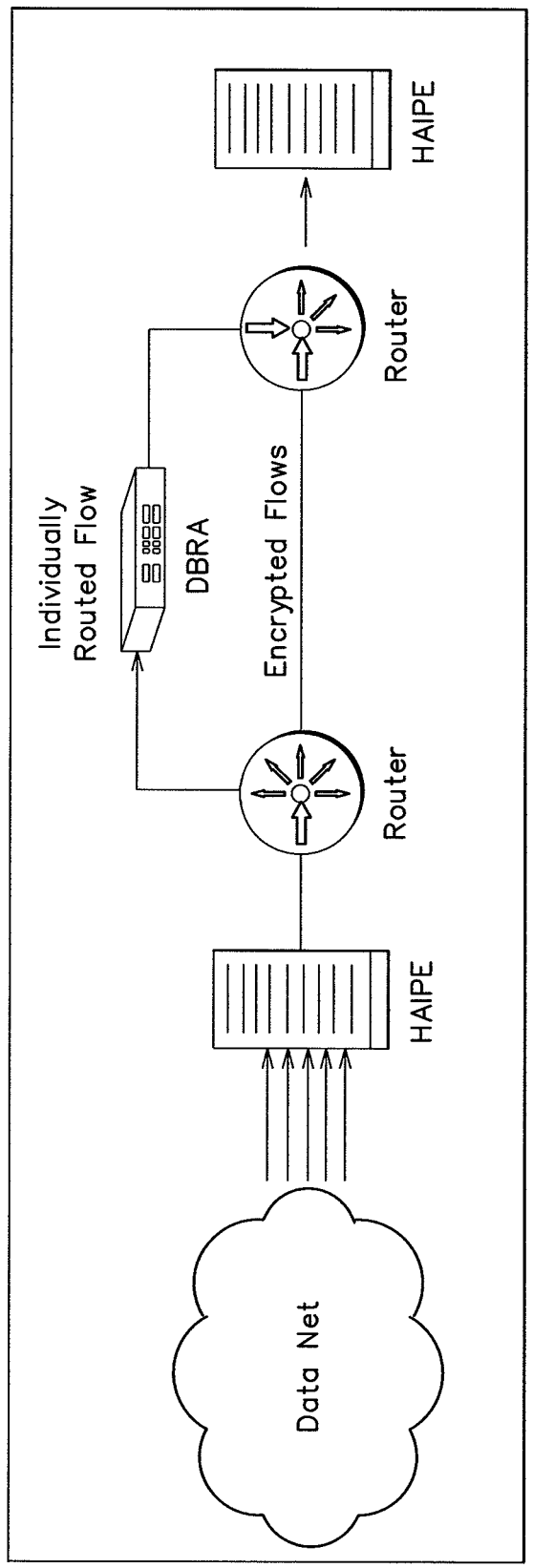
FIG. 12 is a system for flow routing information.

A second unapparent, but recurring issue is the need to identify a target flow from other indistinguishable encrypted flows. For example, if ACK flows were to be used as part of PMC, ACK packets would need to be identified to avoid dropping regular data packets. Ordinarily the two, as well as other flows' packets are identical as they are completely encrypted and both have the same IPsec gateway tunnel endpoints. One solution includes creating a special route for the target flow to follow (e.g., as shown in FIG. 12).

Because an IPsec Security Association for a particular flow can be set to route through a satellite, so too can a secure flow be set to detour through an intermediate point, such as a DBRA controller. A flow passing through the DBRA on the black side, despite being ciphertext, would be observed as the target flow to which our PMC modulation could be applied. One problem with this approach is that packet dropping is not an uncommon effect of the Internet operations themselves. Accidentally dropped packets and purposely dropped ones would mix and create a corrupted message. Prior to applying our message, a stream of packets may be found that has been unaffected by accidental drops, but once the message is applied and until the message reaches its destination, the transmission of the message would be susceptible to the traffic losses in the channel. This particular problem applies, however, to most messaging schemes and may be optionally fixed by the addition of an error correcting code.

On-Rack Middleman

Figure 13:
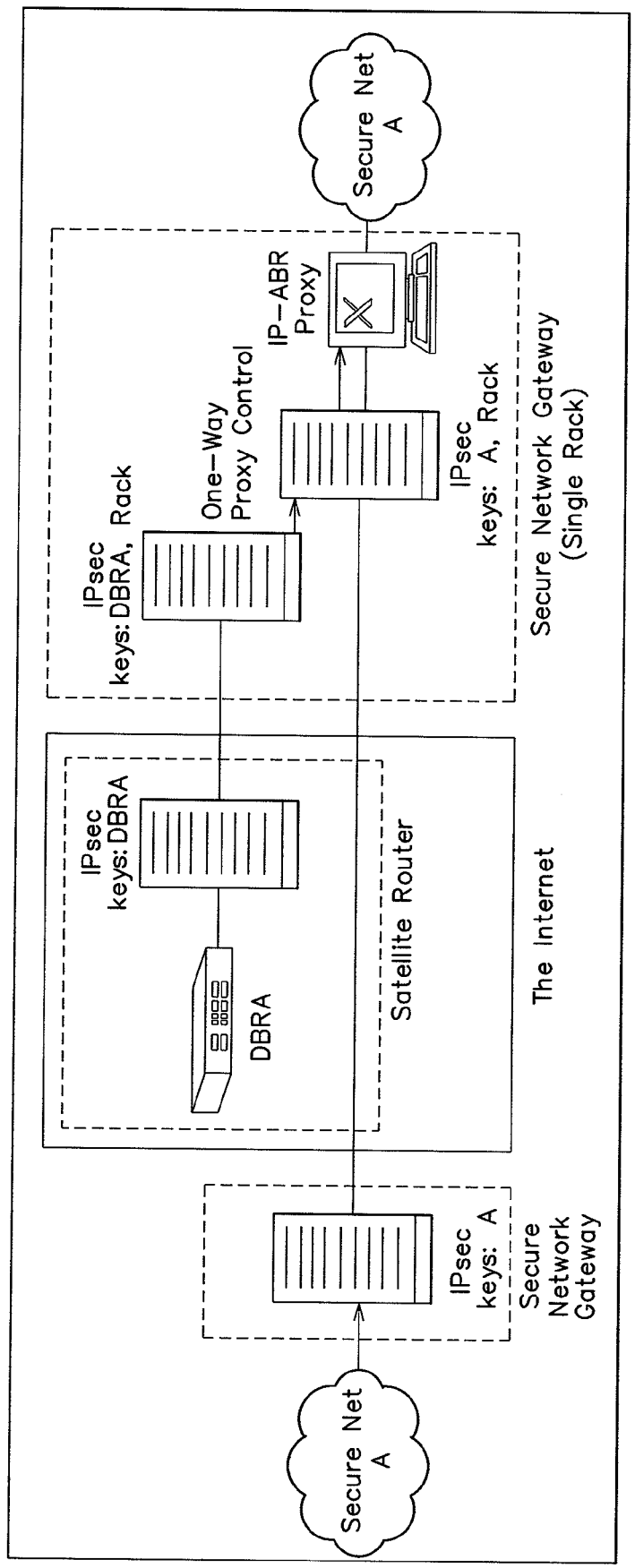
FIG. 13 is a system having two IPsec machines that provide two secure channels.

An intermediate system (e.g., an on-rack middleman) may be employed to share control information to permit the transfer of information with a proxy system. Consider that instead of bypassing security, the ability to share some level of security may be provided, such that the DBRA could pass information to the proxy but not to the red network. Because it may not be desired to permit the DBRA access to the red networks' IPsec gateways, an additional gateway may be added. This "middleman" IPsec gateway may be placed parallel to the red gateway to provide a new channel to the proxy as shown in FIG. 13. The placement referred to here is a physical one, that is both IPsec gateways would lie on the same network rack. This physical situation provides an inherent security, allowing some access within the red network.

In fact the only access that is required is to the IP-ABR Proxy, and to this end it can be a limited connection. In this arrangement, the middleman IPsec device becomes part of the "brown" network, that is a secure IPsec network that shares the DBRA COI key. This is a secure network, though one that does not share red security levels. A confidential tunnel is created between the DBRA and middleman IPsec gateways through which bandwidth messages and other QoS related information can pass securely.

The middleman gateway also shares a third COI key that is only provided to those components on the physical network rack. This on-rack network shares an increased level of security not given to the DBRA, though it still may be classified as part of the brown network, because the gateway is not secure enough to be "red." Finally, the middleman IPsec sends the information to the red IPsec gateway, which recognizes the message as a local IP address and allows limited access as instructed by this Rack Key Secure Association (SA). A one-way and otherwise limited flow is then established to the proxy who can now administer the DBRA instructions to the red side TCP flows. Despite an apparent intrusion into the red network, the security in this architecture is considerable, as the DBRA has no direct access to the red network and there is no way of extracting information from the network because a one way link is established inside the physical rack. This arrangement not only avoids the use of red COI keys by the DBRA, but also avoids any interaction with red secure flow. The only way this system could become compromised would be to breach both the DBRA and the proxy (which is physically secure), in which case a one way channel could be opened. A significant cost of this system includes the use of twice as many IPsec gateways for each secure network.

Explicit Congestion Notification (ECN)

According to one embodiment, it is realized that an Explicit Congestion Notification (ECN) channel available on IP flows may be used to communicate control information. In particular, ECN Expropriation (ECN-X), described in more detail further below, may be used to communicate control information over a secure IPsec gateway. According to one aspect, it is realized that ECN, being widely recognized as a useful feature to the Internet, would be useful even in secure systems to communicate such information. ECN itself provides indirect QoS by reducing packet drops and increasing congestion awareness, improving overall efficiency of the network, but only if coupled with compliant routers, gateways and hosts. For ECN-X, depend on the popularity of ECN to develop such a compliant IPsec protocol. With that in place, ECN-X would be a very powerful tool for performing black-to-red communication.

ECN

The Explicit Congestion Notification concept was discussed as early as 1988 in the SGICOMM forums by Ramakrishnan and Jain. ECN has since then been developed actively for the improvements to QoS that it brings to IP communications. The proposed benefits were a reduction in lost packets and a quicker network reaction to congestion. It was well reviewed and finally was added to the IP standard in 2001 by the IETF. The actual improvements to the Internet as a whole have become disputable, but the standard has been applied to most recent network technology. RFC 3168 also made ECN a necessary option of the IPsec standard.

Figure 14:
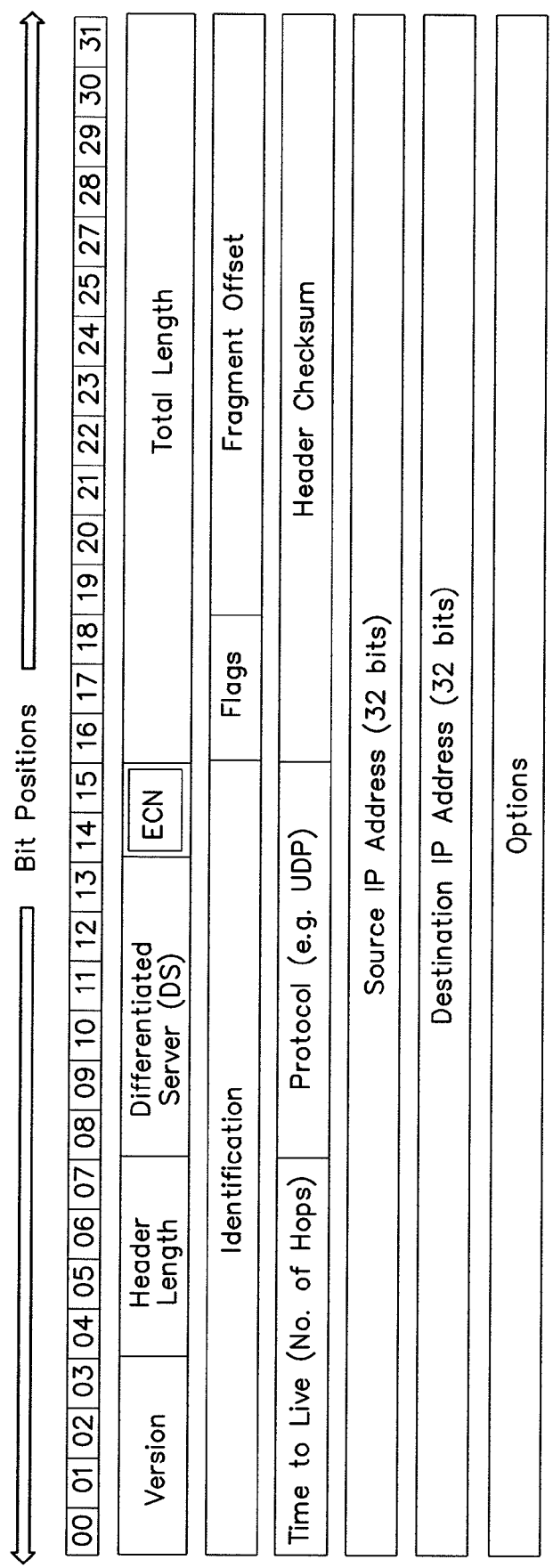
FIG. 14 is an IP header template where ECN bits reside.

The Internet has the unenviable task of providing high efficiency, and fairly divided utilization of its resources to all users at all times. It must achieve this goal despite the highly dynamic traffic patterns that occur and the lack of a priori information regarding its use. Maintaining throughput is then the necessary job of routers, which are the assigned on-ramps and off-ramps of the Internet. Basic routers though, have a simple rule for dealing with congestion: if the router has too many packets, drop them. The TCP protocol in turn has to react to this behavior by monitoring its data packets constantly. Given that routers can drop packets without warning, the TCP protocol is forced to rely on packet timers and acknowledgements to make educated guesses on the status of packets. In the case of a satellite link, this means waiting up to several seconds before being able to react to a congestion problem. ECN proposes to increase the intelligence of routers and allow them to make decisions about the level of congestion on the network. In the case of a noticeable increase in traffic the router informs the end users about the congestion, where ECN-enhanced TCP code acts accordingly without having lost data in the process. This communication occurs over two bits located in every IP header (as shown in FIG. 14). Instead of dropping a packet during congestion, the router marks these ECN bits as a notification of incipient congestion and allows the packets to pass through. These marked packets are routed to their end IP destinations, even through secure gateways, where the original TCP source can be informed of the current network status.

ECN Expropriation (ECN-X)

According to one embodiment of the invention, it is appreciated that the ECN standard permits use of two ECN bits in each IP packet providing a way to carry data across a secure IPsec gateway. Simply stated, the TCP/IP flow itself is made to be ECN capable, but the ECN bits are expropriated for performing a separate QoS algorithm. Using ECN codepoints to represent bits, according to the specification, it is appreciated that messages could be passed through IPsec encryption as a part of a method for performing congestion avoidance. In this way, a satellite control channel is realized through a constant flow of bits that is directly communicated between the DBRA and IP-ABR Proxy.

Furthermore, the control channel exists as part of an independent flow of information between red networks through the satellite. This means that the bandwidth used by the satellite to send the control information is never increased, as the total amount of data passing through the satellite remains the same. The benefits of such a system are clearly visible, but indeed this configuration also holds with the original purpose of ECN by reducing congestion through a separate QoS system. In fact, it is appreciated that the gain is so great that certainly there would be no need for ECN in an IP-ABR enabled network, considering the known average improvement of ECN alone. The justifiable use of these bits as a control channel, as well as the features of this method are discussed more fully below. It is appreciated that several additional improvements could be made (particularly in the area of security) which may lead to the further optional configuration.

Doubly-Encrypted ABR Control (DEAC)

Despite the convenience of a piggybacking system such as ECN-X, it is appreciated that by using an On-Rack Middleman design that the security of this arrangement may be improved as part of a complete DBRA scheme. It is appreciated that piggybacking methods of communicating data are prone to snooping or falsification, as the control data is plaintext and easily readable and modifiable. Unauthorized manipulation of the control channel could severely impair a system by producing fraudulent information resulting in severe QoS loss (e.g., allocating unexisting bandwidth to users would cause Denial of Service at a critical link) Furthermore data channels could be opened both to and from the red networks, resulting in an unacceptable breach in security.

Clearly, control flows should be, according to one embodiment, prohibited from intrusion on the black side. One goal in this arrangement is to insure the same level of security as is given the red data itself without compromising the existing red encryption. To accomplish this, what is referred to herein as a Doubly-Encrypted ABR Control (DEAC) is provided which employs two secure networks masked as one. The original secure flow between red networks is maintained, while it is re-encrypted alongside the DBRA/proxy control flows to create a single unreadable flow (see, for example, FIG. 13) which can then safely pass through the black network. This second tunnel is only removed on the secure racks that hold red IPsec gateways, and on the satellite itself. The second tunnel is referred to herein as IPsec II, and the original as IPsec I as they overlap at times but are never sharing secure key information. The DBRA control flows are encapsulated in the IPsec II tunnel from the satellite to each of the network gateways. On the black side, no plaintext is revealed but a single encrypted flow in which control information cannot be distinguished from secure data. At the physical rack, which can be referred to as 'red' for its inherent physical security, the control flows have traversed the unsecured black side almost completely and are within a few physical feet of the IP-ABR Proxy. Red network security is of course never compromised, which means that a method is needed for passing information through IPsec I.

The DEAC system can be implemented with any of the previous communications schemes for improved security; for example by making ECN-X or ICMP Piggybacking immune to snooping or modification on the black side. Instead however, a new approach may be used for performing through-IPsec communication which would not depend on IPsec administrative options like the above implementations.

In one example discussed more fully below, what is referred to herein as a "Credit Bucket" concept builds on a notion of representing encrypted packets as symbols in a message. In this case however, to elicit maximum security, the communication may be limited to sending an increase or a decrease of bandwidth per QoS class. The main thrust of the new approach is to avoid creating any channels through which data can be sent or received from the red side. A Credit Bucket DBRA Control manages connections by issuing credit 'tokens' which can be used as redeemable bandwidth. Alternatively, the control may also issue negative value tokens which would reduce bandwidth allocation.

Figure 15:
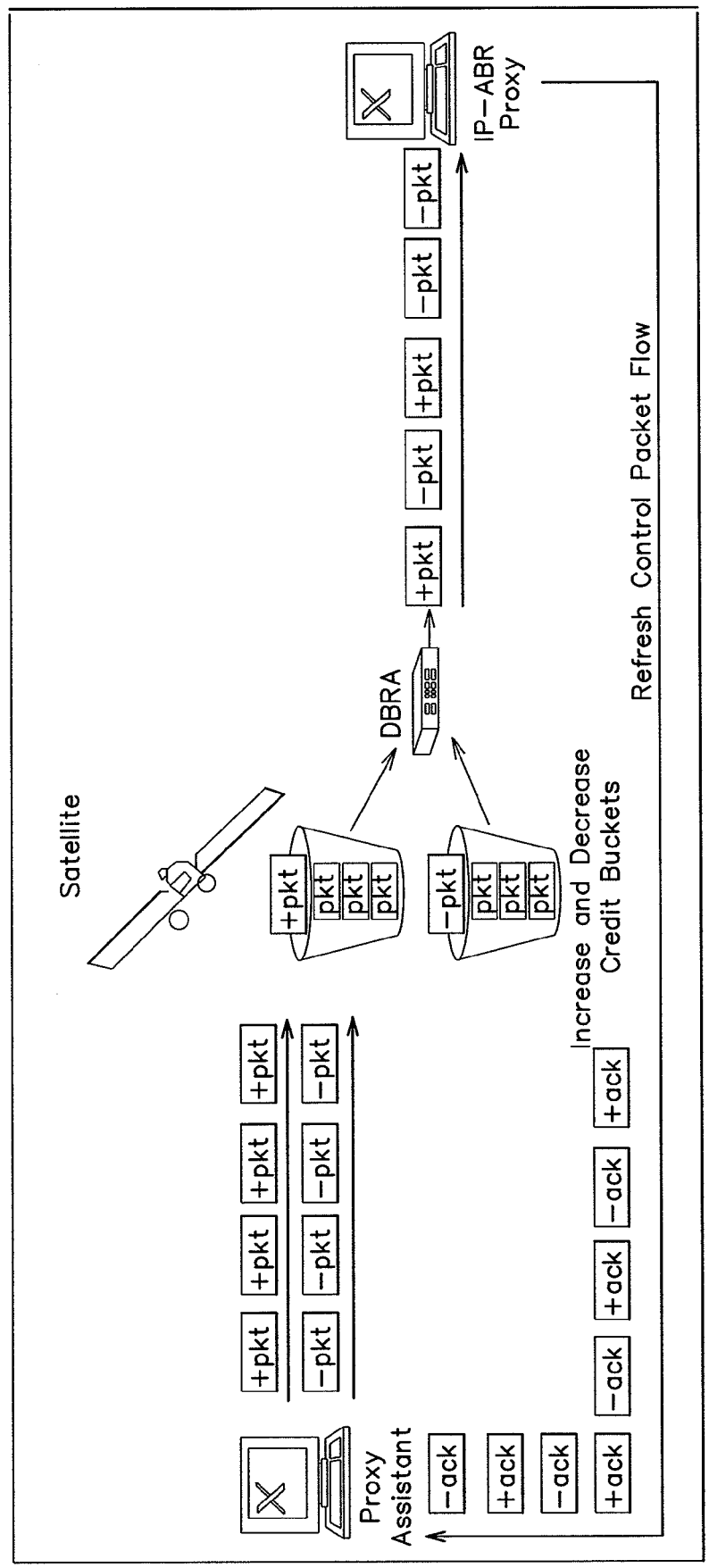
FIG. 15 is a diagram of a credit bucket DBRA inside a DEAC layout.

The tokens themselves are encrypted packets that are collected as currency by the DBRA in what we call credit buckets (see, for Example, FIG. 15) at the satellite router. The packets themselves can be more blank frames which are made unique by the route they use outside of the red networks. As an example shown in FIG. 15, positive bandwidth increase packet-tokens are routed through port #1 of the DBRA while negative bandwidth packet-tokens are routed through port #2. The DBRA can now identify them, despite their illegibility, and proceeds to sort and store them accordingly in the buckets.

As secure packets, these tokens need to be actively moving to escape the vigilant eye of the IPsec gateways, which are constantly monitoring for intruder attacks. As mentioned above, a sliding packet acceptance window only allows a certain number of packets to actually enter the gateway at any given time. Repeated or old packets are simply cast away to avoid Denial of Service or replay attacks. A 'stale' packet, that is, one who has missed its receive window would no longer be able to pass as a credit token through an IPsec gateway. Stale packets are thus avoided by constant refreshing. In a steady state mode, while no bandwidth increases or decreases are occurring, the tokens are constantly cycled through the system. A token from a bucket is released as a new one arrives to take its place. One from each bucket is released in alternating order to cancel the other's value. A variation in the constant alternation would correspond then to a message for the proxy.

DEAC Conclusions

The security implications of a complete DEAC system are many and of considerable value. The first, and most obvious realization is the lack of plaintext anywhere in the arrangement. Control flows are always unexposed and inseparable from encrypted secure data. At the secure rack locations, and only there are the control flows separated, but they are never plaintext. Rather, if these points are compromised, all an observer (e.g., an attacker) would see is a group of equally indecipherable flows. After compromising the satellite, as well as gaining some pattern knowledge, then an attacker could potentially forward packets in such a way as to create some bandwidth control interference, but he would still never retrieve information from a secure network.

The security of this system having been described, the practicality of this design may also be determined. Unfortunately, with too many restrictions comes a price in usability. Certainly, limiting communication to two messages brings with the method inherent scalability problems. Indeed, it is appreciated that to communicate per-class bandwidth allocations, two dedicated IP flows are needed as token streams for each. This may not only represent a noticeable amount of lost bandwidth on a limited satellite channel, but also an increased burden on the IPsec administrator which would need to maintain the fallacious routes necessary for the Credit Bucket System. Each of the class-based control flow pairs would require an individual IPsec SA to maintain distinction from the secure data flows, and each SA has to programmed into each red IPsec. Thus, there is a problem of administrator dependence and hence there is a need to consider whether yet better approaches can be found.

POM

Packet Order Modulation (POM), as referred to herein, is a messaging scheme developed as a way to send information through the artificial reordering of data flow packets. As referred to herein, the term "artificial" is used to highlight the fact that packet reordering occurs naturally in typical IP communications. In fact, it may be said that the capability to withstand packet reordering is an invaluable part of the TCP protocol, as the protocol was designed to encompass the uncertain nature of packet delay and hence packet order in packet-switched systems.

It is appreciated that in traditional networks, best effort performance is generally achieved through the use of multiple link routing between two hosts. In such a case, information is partitioned into packets which can be sent individually, without regard for order through many, possibly volatile, but often parallel links to reach an end host. This results in common packet reordering in as many as 90% or more of sessions. All TCP packets, therefore, have sequence numbers with which the receiver can reorder them to recreate the original message. Now, if the order in which packets arrived was itself a recognizable pattern, then this accepted phenomenon of packet-switching may be used by an entity to send its own control messages. By reordering three packets, for example, one of five patterns may be sent, (not including the unordered set) the set of which could represent five different messages that can be indicated to the receiver. According to one embodiment using such a messaging scheme, the underlying data of the packet flow remains unchanged and only the order of the received packets is adjusted. There is no addition of data payload to the packet, as the packets used are those already passing through the link.

Figure 16:
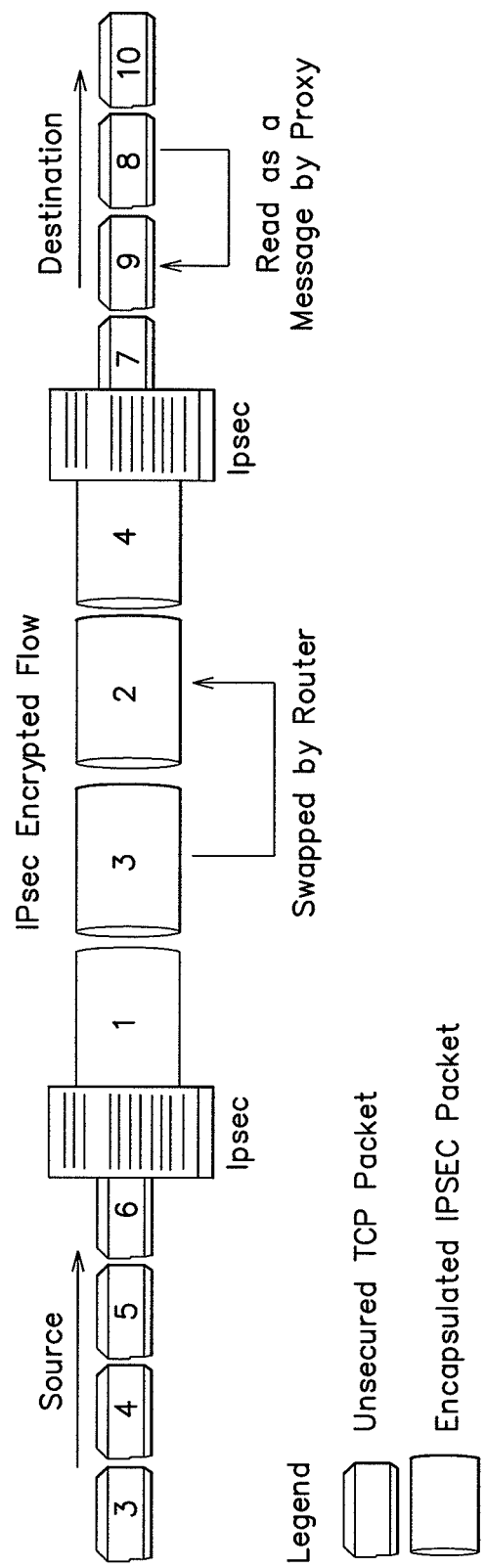
FIG. 16 is a diagram showing packet order modulation (POM) according to one embodiment of the present invention.

Consider a simple example whereby a POM-aware end host receives a packet expected to be third in a message, before the first and the second arrive. This might be chosen to signify that bandwidth on the link has been reduced by a half, and to avoid data loss the source reduces its output accordingly. Finally, the receiver reorders its received packets as it would typically and retrieves the message from the three received packets, successfully passing the control information without modifying, adding or destroying any data. Applying this method to an IPsec environment, it may be found that the same receiver rules still apply, and that the communicated information passes freely through an IPsec gateway. IPsec, like TCP, is connection-oriented and so uses sequence numbers to identify the order in which the packets should be reassembled at the destination. IPsec ESP packets use a set of plaintext (though authenticated) sequence numbers available on their top header which correspond to a particular SPI. These sequence numbers do not correspond to the numbers of the encapsulated TCP packets which are not visible, but are assigned in the same fashion with consecutive values (see, for example, FIG. 16).

Figure 17:
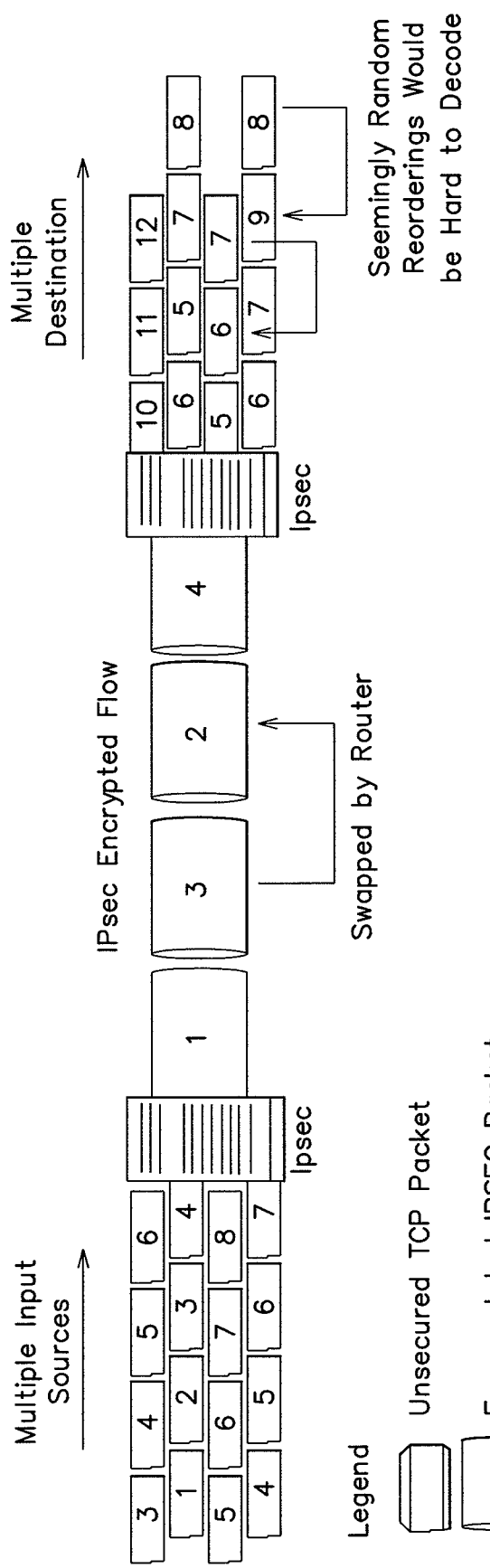
FIG. 17 is a diagram showing multiple flow reordering.

Unfortunately, having multiple flows encapsulated at once destroys any relationship the ESP flow might have with any underlying flow (see, for example, FIG. 17). This is clearly a great deterrent for POM as a form of nefarious communication on an arbitrary IPsec flow. However, in a controlled environment this obstruction can simply be averted to allow the use of POM in a variety of ways. This could be done, for example, by using an independently routed flow which would require its own encapsulation, but that would subtract from our total bandwidth and would need specific IPsec administration. Instead, all red flows may be encapsulated before passing through an IPsec gateway thereby reducing multiple flows to one individually sequenced packet stream. The added encapsulation adds 24 bytes to each packet for header information, but does not add delay as it is not encrypting the data similar to how an IPsec tunnel would.

Doubly Encrypted POM

According to one embodiment, POM may be used as an enhancement of the DEAC scheme. In one example, POM may be used to build upon the best attributes of DEAC, particularly its use of double encryption. POM messaging may be used in lieu of the Credit Bucket System and its associated complexities to provide greater flexibility without sacrificing the security enhancements it was designed to yield. The original IPsec red tunnel may be used undisturbed. What may be added to the system is a secondary IPsec tunnel which wraps satellite control information and red encrypted data into a single flow between the satellite and the red networks, which is never exposed to the black side. One goal is to provide some level of security to the satellite without compromising any sensitive information passing through as well. The communication between the DBRA at the satellite, and the POM sender, logically placed before the secure gateway, is simply a fast and efficient TCP connection. Given the second layer of encryption, control information may be transmitted to the very edge of the red IPsec gateway where through-IPsec communication may be performed.

Figure 18:
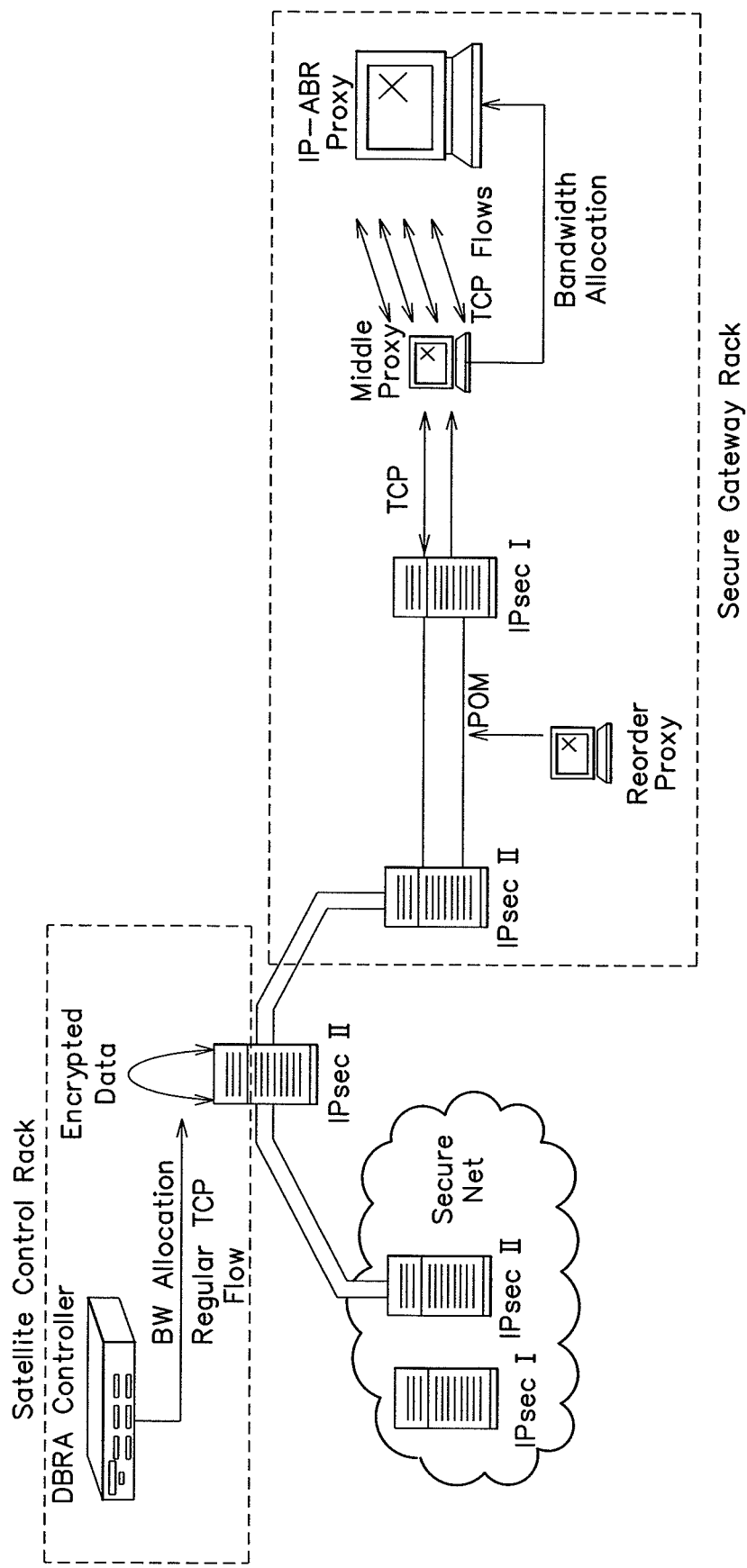
FIG. 18 is a diagram of a system using doubly encrypted POM according to one embodiment of the present invention.

By using POM physically a few feet away from the IP-ABR Proxy, the chance of corruption from natural packet reordering is minimized (e.g., by an intervening entity). For example, in FIG. 18, a reorder proxy is provided which is placed physically on the Secure Gateway Rack but is still blocked from the red network. The reorder proxy receives the control information from the satellite on the second encryption tunnel and then proceeds to reorder the red IPsec tunnel packets into a message. A middle proxy positioned on the red side may be adapted to "catch" the reordering after IPsec decapsulation, and then the middle proxy releases the red TCP flows to the network. The extracted information is passed on to the IP-ABR Proxy which can now make QoS control changes. The reorder proxy is also tasked at this point with incoming packet sorting. By ordering according to sequence numbers, any unauthorized use of the POM channel is removed before the data reaches the red network. The combination of the second IPsec tunnel and reorder blocking not only improves security in such a messaging scheme but also makes the network itself more secure.

Example Implementations

According to one embodiment, various implementations may be used to facilitate the communication to the secure side as discussed above. In one example, different physical models may be used. These models include, for example, an ECN-X and a POM system which in themselves represent the two major categories of solutions: direct and indirect data transfer. Each of these implementations present different challenges.

ECN-X

A first consideration in implementing ECN-X is the detailed operation of ECN itself. How data is piggybacked depends on rules of proper ECN usage, as stepping outside the protocol might result in problems later on. Furthermore, the interaction between ECN and IPsec becomes particularly important because it determines if and how the communicated information gets through. This information can then be applied to any implementation (e.g., in software).

ECN Technical Details

As is known, the ECN service exists at the transport layer, and is enabled as part of each TCP connection established between two ECN-compliant machines.

TABLE III

ECN Codepoint Definitions

| TCP ECN Field | Codepoint |
| --- | --- |
| 0 0 | Non-ECT |
| 0 1 | ECT (1) |
| 1 0 | ECT (0) |
| 1 1 | CE |

On the start of a new flow, the use of ECN is negotiated, depending on the host options at both ends. Having agreed, the flow is now identified as an ECN-enabled channel, and is advertised through the use of the ECN bits.

Originally, two bits designated as the ECN field were created as part of the Type of Service (TOS) Octet in the TCP header and each one had a specific message. The first bit set to 1 referred to an "ECN Capable Transport" (ECT), and the second signals "Congestion Experienced on the Channel" (CE). The bit values are now obsolete and the bit combinations are referred to instead as "codepoints." The 'ECT' and 'CE' abbreviations are still used in the codepoints though the arrangements are different. Table III above describes the codepoints. A non-ECT codepoint is one that will be treated by routers and endpoints as a typical TCP/IP connection, wherein packets are dropped as a reaction to congestion.

There exist two ECT codepoints for the purpose of legacy support. The codepoints both indicate to a router that the end hosts are ECN capable. An ECT-marked flow is also one which IPsec recognizes and to which will apply certain ECN rules, which are crucial to this method. Finally, a CE codepoint is the only codepoint set by the routers themselves, for the purpose of advertising congestion.

ECN/IPsec Interaction

The interaction between IPsec and ECN is straight forward. The IETF has created a set of rules by which ECN can operate under IPsec which are restrictive but still allow for ECN operation on and through an encrypted network. The purpose of this enforcement is clearly to stifle a large side channel that could transport data directly through an IPsec gateway. However, it is appreciated that a system may work within these rules to achieve communication as discussed.

Figure 19:
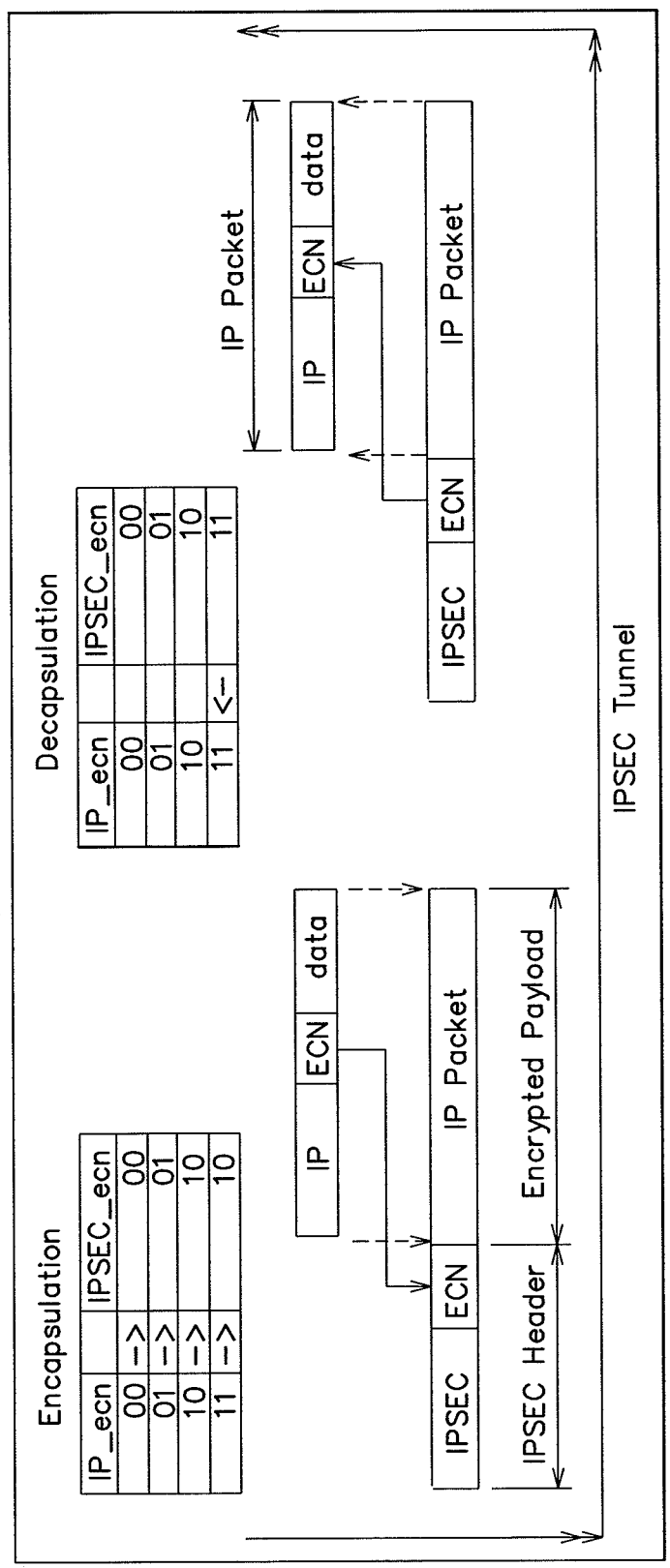
FIG. 19 is a diagram showing IPsec interaction with ECN bits.

There is a slight distinction between the security of an outgoing flow and that of an incoming flow. In this case, outgoing is referred to herein as moving from the red to the black side, that is involving the encryption or encapsulation of a packet. The incoming direction involves the decryption or decapsulation of a packet entering the red side from the black. The latter direction is the direction to be used for communicating control information, and is the harder one to exploit. As mentioned above, when IPsec encapsulates a flow, a new temporary header is attached to the encrypted packet with only enough visible information to route the packet to the destination IPsec gateway. For an ECN-enabled flow, the ECT advertisement needs to be visible by routers, so the ECN bits are directly copied from the IP header to the IPsec header for the first three codepoints. FIG. 19 shows an example IPsec interaction with ECN bits. On the other hand, there is no need to advertise a CE codepoint to the black side since this information is only useful to the end hosts and so it may be replaced on the IPsec header with an ECT codepoint. The value in the original header of course is untouched.

According to the original IPsec standard, when exiting a tunnel, or rather entering a red side, the receiving IPsec gateway removes the packet's temporary header which was attached by the encapsulating IPsec gateway. Normally, all IPsec header information is lost intentionally to avoid information entering a secure network. Most of the ECN codepoints in this case are also lost. In fact, the only thing kept is congestion information about the black side, and only the CE codepoint will be transferred from an IPsec header to the IP header as shown in FIG. 19. In all other cases, no action is taken and the original codepoint is kept. This is also only true if the underlying flow, that is the TCP packet is really ECN capable, that is if IPsec finds a CE codepoint on the IPsec header but a non-ECT codepoint on the TCP header then the bit change is dismissed. In the case of an encrypted packet having experienced congestion on the black side the result would be a packet on the red side with a marked '11' in its ECN field. Conversely, if it does not experience congestion the packet on the red side will retain its original '01' or '10' referring to its ability to use ECN. This is a binary distinction with which messages may be built. These messages can then be read by an IP-ABR Proxy on the secure side and applied as QoS settings for the red flows.

Software Tools

Figure 20:
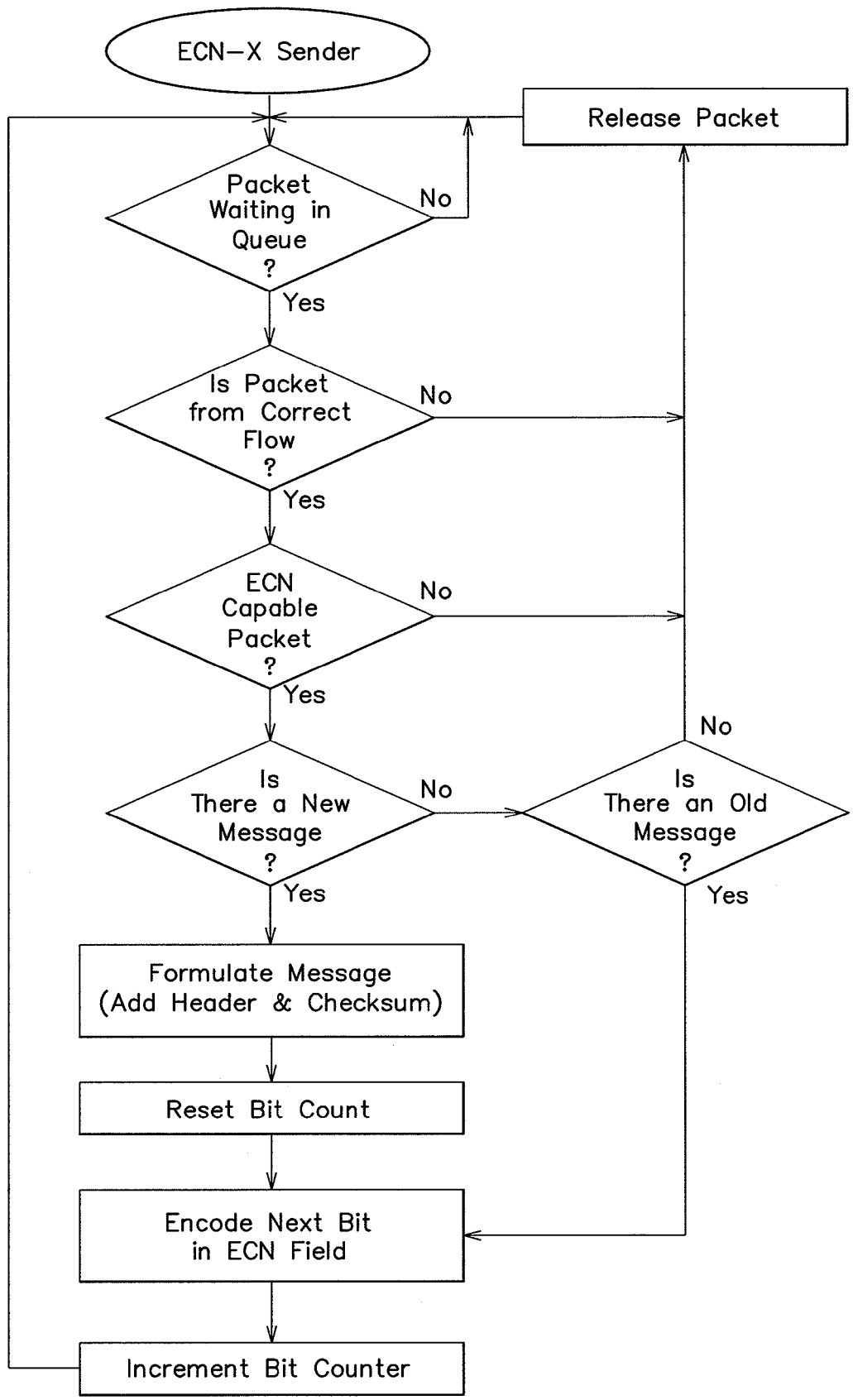
FIG. 20 is a diagram of a process performed by an ECN-X sender according to one embodiment of the present invention.
Figure 21:
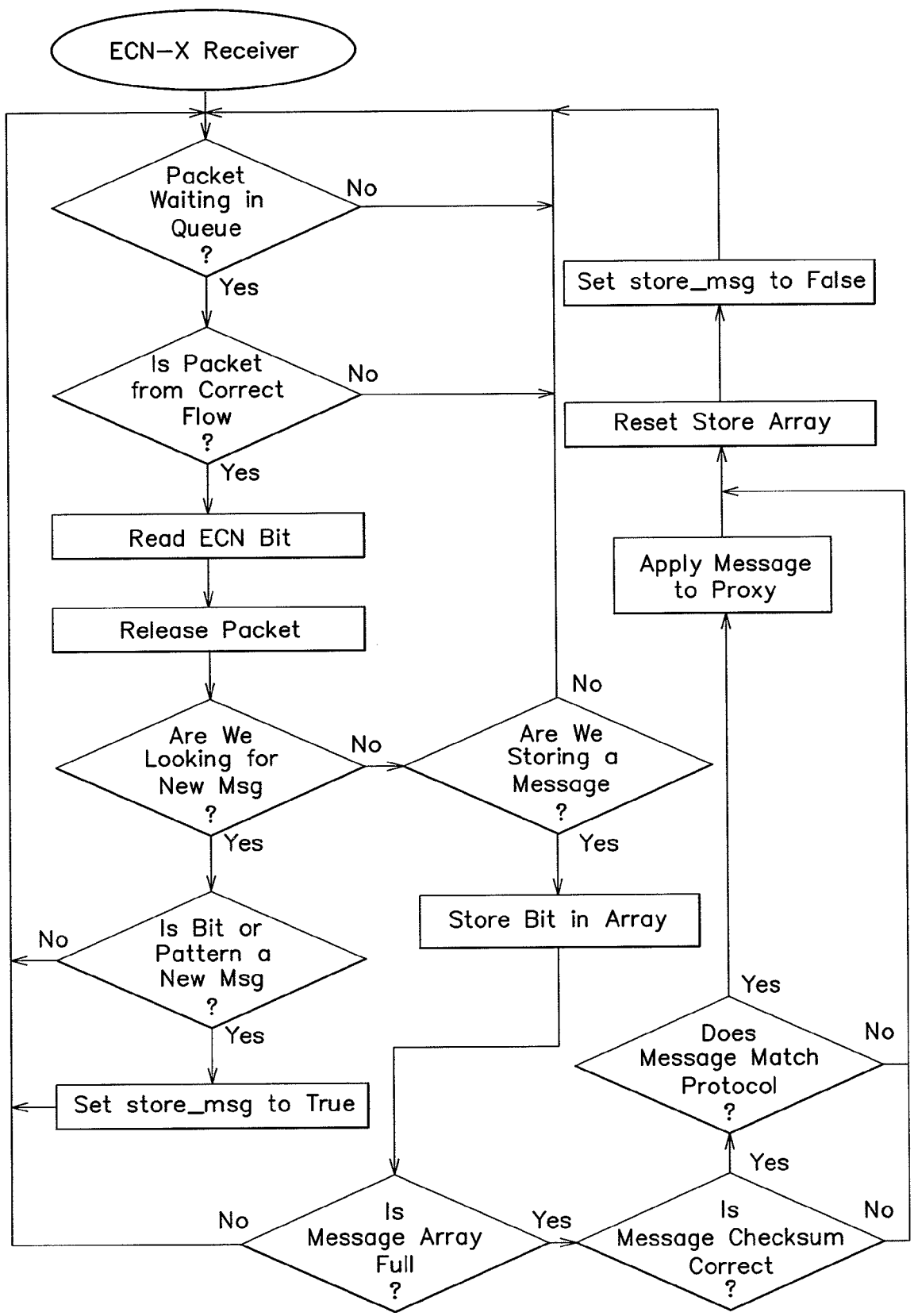
FIG. 21 is a diagram of a process performed by an ECN-X receiver according to one embodiment of the present invention.

For this implementation, the chosen development base was C and C++ in a Linux operating system. The reason for this decision is due in part to personal preference as well as compatibility with the previous implementation of the IP-ABR Proxy. Specifically within the Linux OS this software can be compiled to be compatible with kernels 2.4.x and 2.6.x. Two independent software pieces are necessary, one to send the ECN-X messages and one to receive them. They both require roughly the same components and so share most of the programming code. However they differ in the order of operations and in their interaction with the user/controller. Example high-level flow of the programs are shown in FIGS. 20 and 21 discussed below.

The following are fundamental elements of one example ECN-X system according to one embodiment of the invention. This section details each component, and their interaction with the overall system.

Kernel Module Base

The kernel in an operating system acts as a mediator for programs on a computer. The kernel manages all the resources, including memory and processor usage, to provide fair usage for all software in userspace. As a middleman however, the kernel has the side effect of adding another hurdle to the software's execution. For this system, speed will be of great importance and so will consideration.

Furthermore direct access to the resources are important, particularly to the Network Interface Card (NIC) and to processing power. Optimally, an independent operating system can be created or an existing one may be modified to minimize the overhead expense. Software working at the operating system level is deemed to be in kernelspace. By developing software as kernel modules, it sidesteps the middleman and provides increased control of resources including, but not limited to, network traffic access. Direct access to hardware also extends to the CPU itself which grants the modules "supervisor" or extended access. The single downside of this method is the lack of function support that one takes for granted in userspace. The only library references available will be those that are part of the existing kernel. Also, simple communication to the user through consoles or any standard output is also forfeited.

As a counterpart to these deficiencies is the benefit of the kernel libraries such as Netfilter which provide flexibility in network interactions. Packet Capturing One of the most important mechanisms in the software is the interaction with network packets on which control messages are transported. Here the choice to use an outside software package is obvious, as the de facto standard in Linux packet filtering, is well known. The Linux Netfilter package was developed as a framework for packet manipulation "outside of the normal Berkeley socket interface". What it provides is five clear stages in the packets' traversal through the Linux network stack, known as hooks, which can be identified and referenced for various purposes. The following are the five hooks attributed to IPv4:

1. PRE-ROUTING—This location provides access to all incoming packets.
2. LOCAL IN (INPUT)—Packets destined to the local host will not be routed, therefore this is the last point to access them before they are passed to a userspace application.
3. IP FORWARD—This hook provides access to packets that are just being forwarded through the machine.
4. POST ROUTING—Hooks packets after routing decisions have been made.
5. LOCAL OUT (OUTPUT)—Last option before packets are transmitted. Provides access to all out-going packets.

A kernelspace program can register to 'listen' to a specific hook with Netfilter, which then gets called with every matching packet found. A 'hooked' packet is held indefinitely by the program until it returns to Netfilter with a decision to either let it continue through the hooks, discard it, to ignore it or to send it to a waiting userspace program. The most common use of Netfilter is through a package called "iptables" which filters incoming packets to act as a Linux firewall. In this case, the kernel modules will attach to the forward hook to oversee packets passing through the satellite router. When packets are passed to the module they can be modified to include the DBRA message, or simply read in the case of the receiver. The module returns the modified packets to Netfilter with the command to continue its path as it was determined originally. The packet then finishes its traversal through the router and continues from the router to its destination.

In some implementations, it may be necessary to communicate with userspace from kernelspace modules, but it should be appreciated that other implementations may not need to do so. In one particular case, there are two instances of programs with which we need to interact that reside in userspace. Firstly, the sending module requires a message to send. In the full model this would refer to the DBRA which might reside in the same machine or might communicate over TCP either with this router or another managing system, but which ultimately would reside in the more common userspace. In one test model, the DBRA is either the test operator, a user, or a sequencing script, both of which operate in userspace. The receiving module needs to apply the messages it acquires to the IP-ABR Proxy which may reside in userspace and so needs to communicate across the wide gap of kernel and userspace to the receiver. In another implementation, the proxy may also be ported into kernelspace for the reasons aforementioned.

Another approach may involve, for example, a common element existing Linus kernels: the /proc file system (procfs). The /proc file system of course is, exactly, not a file system. In the /proc folder there are in fact no 'files' and so it cannot be truthfully called a file system. However, when navigating into the procfs folder, the interaction is like that of moving through a tree of files and folders. What they represent, however, is time varying process and kernel information that would otherwise be very hard to find using system calls and debuggers. The /proc file system is best described as an organized mirror image of the system currently in memory. The utility of procfs in our case is slightly different. We want to use these dynamic files as a method for communicating between kernelspace and userspace, a task which is otherwise a complicated procedure requiring considerable time and dedication on the part of the programmer Creating a procfs file is not much more difficult than creating regular file in kernelspace, though it has the added benefit of simply acting as a variable which can be updated constantly. In userspace, procfs is a file which can simply be read continuously for changes or even modified to send information in the other direction. This allows for a simple method of communication that is easily implemented.

Communications Protocol

A communication protocol as used herein is a standard method for transmitting information between two hosts. Such a method may specify a set of guidelines as to how much data is sent, how it is packaged, protected, etc. A standard protocol may be developed for sending messages from the DBRA to the IP-ABR Proxy through the ECN-X system. This is particularly tricky because of the unorthodox method that may be used to transfer the information, but for the same reason the protocol is preferable to insure proper communication.

A first deviation of this 'medium' from a classic IP channel is the severe limit on bit rate. The relative speed is that of 1 bit per 1 packet for ECN-X. If we consider the link speed for a typical T1 satellite circuit, that is $$1.536 \frac{\text{Mbit}}{\text{second}},$$

and an average packet size to be of 500 bytes (576B MSS is assumed for IP[18]), then we can acquire a rough estimate of $$1.536 \frac{\text{Mbit}}{\text{second}} * \frac{1}{500} \frac{\text{ecnbits}}{\text{byte}} = 364 \frac{\text{ecnbits}}{\text{second}} \text{ or } 48 \frac{\text{bytes}}{\text{second}}$$

when an 'ecnbit' is simply a bit sent through ECN-X. For this particular protocol implementation, this translates into a need for small messages which can be transported quickly.

Figure 22:
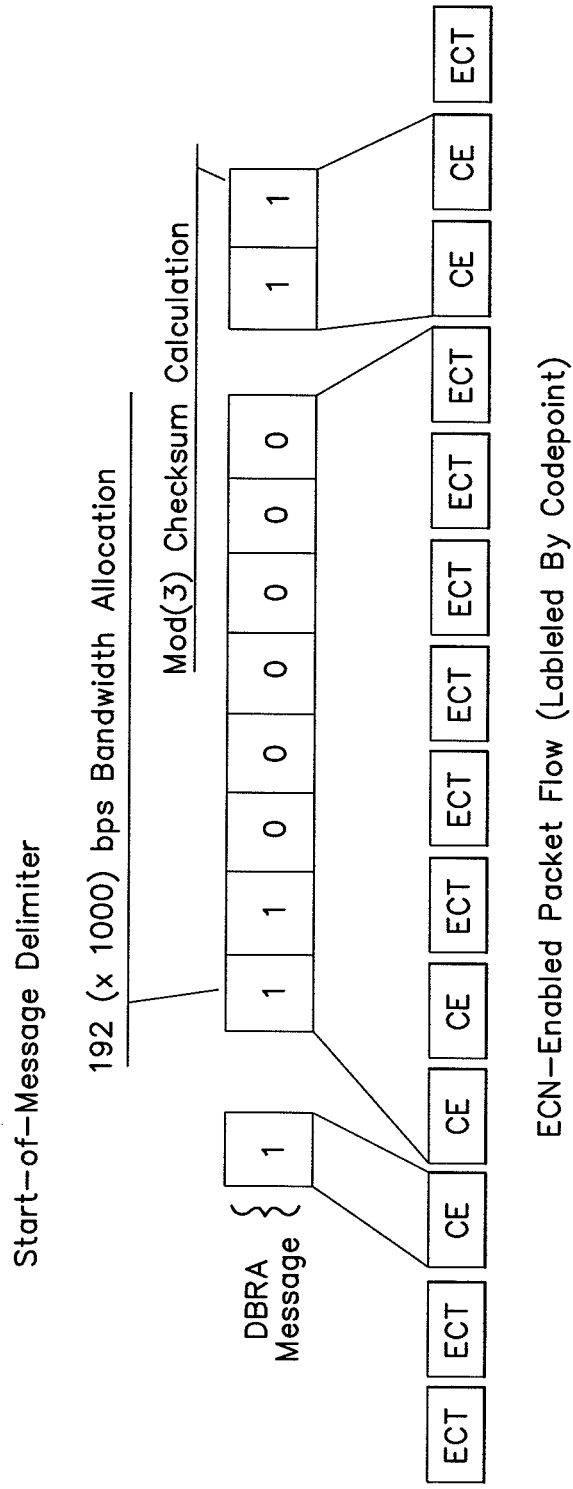
FIG. 22 is a sample ECN-X message using codepoints.

Secondly, the distribution of bits within a message across as many packets increases the probability for corruption immensely. As packets are dropped by one router or the next missing bits in a message result. Shuffled packets can be, using their sequence number, reordered to some degree but this would also require a memory buffer as part of an implementation as well to reform messages. These issues may be resolved with various forms of message verification or even error correction as part of the protocol. This might increase the average message size but would in the long run avoid message errors and the need for retransmissions. Thirdly, a more basic aspect of the protocol is that of message packaging. Because, according to one embodiment, bits are piggybacked on an arbitrary flow of data, packets will continue to pass through the receiver whether or not messages are being sent along. The receiver then needs to be able to identify a message from out of a continuous stream of bits. To identify the beginning of a message, a Start-of-Frame (SoF) delimiter may be used. In this case, some kind of bit pattern may be used which is not likely to appear without external manipulation. An Endof-Frame (EoF) delimiter is not necessary if it is stated as part of the protocol a static size for the messages. As part of the implementation, we designed a simple protocol for our messages according to the need given above. The following are example protocol characteristics according to one implementation (FIG. 22 shows a sample message):

1 bit SoF delimiter—For routers, the ECN service may not be activated and thus will never modify the ECN bits on the packets. Thus, it can be assumed that all unmodified packets will always preserve an ECT codepoint, and by activating a CE codepoint on a single packet the beginning of a message may be signaled.

8 bit scaled message—The only message type needed to be send at this point is that of the DBRA allocated bandwidth. The 8 bits will therefore be read as an integer from 0 to 255 and will represent the number of kilobytes/second to which all flows managed by the proxy must be limited to. The message in this way is scaled x1000. Although it limits finer bandwidth resolution, it reduces the message size greatly to improve DBRA communication speed.

Variable bit checksum—To verify the integrity of our messages, several appended bits are used as a checksum for the whole message. The total number of bits in the message is added using modular arithmetic where the modulus n is the maximum number representable by our checksum bits. Re-calculation of this number on the receive side and comparison with the original checksum will reveal a corrupted message. A larger number of bits can provide a higher error-detection resolution, which is the reason why it was implemented as variable. Both the sender and the receiver, however, have to be synchronized to the same modulus to communicate correctly.

One implementation of a working system may include an IP-ABR Proxy that actively controls TCP flow. The IP-ABR Proxy may be coupled with a TCP-based controller that is used to manipulate QoS settings remotely. As part of this implementation, the proxy may be modified to be controlled by the ECN-X module through the use of a /proc dynamic file. The choice to use the ECN-X controller versus the original TCP implementation can be specified as a proxy command line option.

localhost:proxy/bin>./ipabr-pep –h
usage:
ipabr-pep
–e Enable proxy packet processing, proxy can also be enabled remotely using the client (default disable)
–r<Bandwidth> Required max aggregate bandwidth
[–d] This makes the proxy fork off and run as a daemon, which is not the default behavior
[–s] This makes the proxy log to syslog
–p<Control Port Listen> Port on which proxy listens to remote
Bandwidth allocation messages (Default 54321)
[–l] Optional Should proxy listen to ECN channel (Client is Default)

ECN-X Modules

Figure 23:
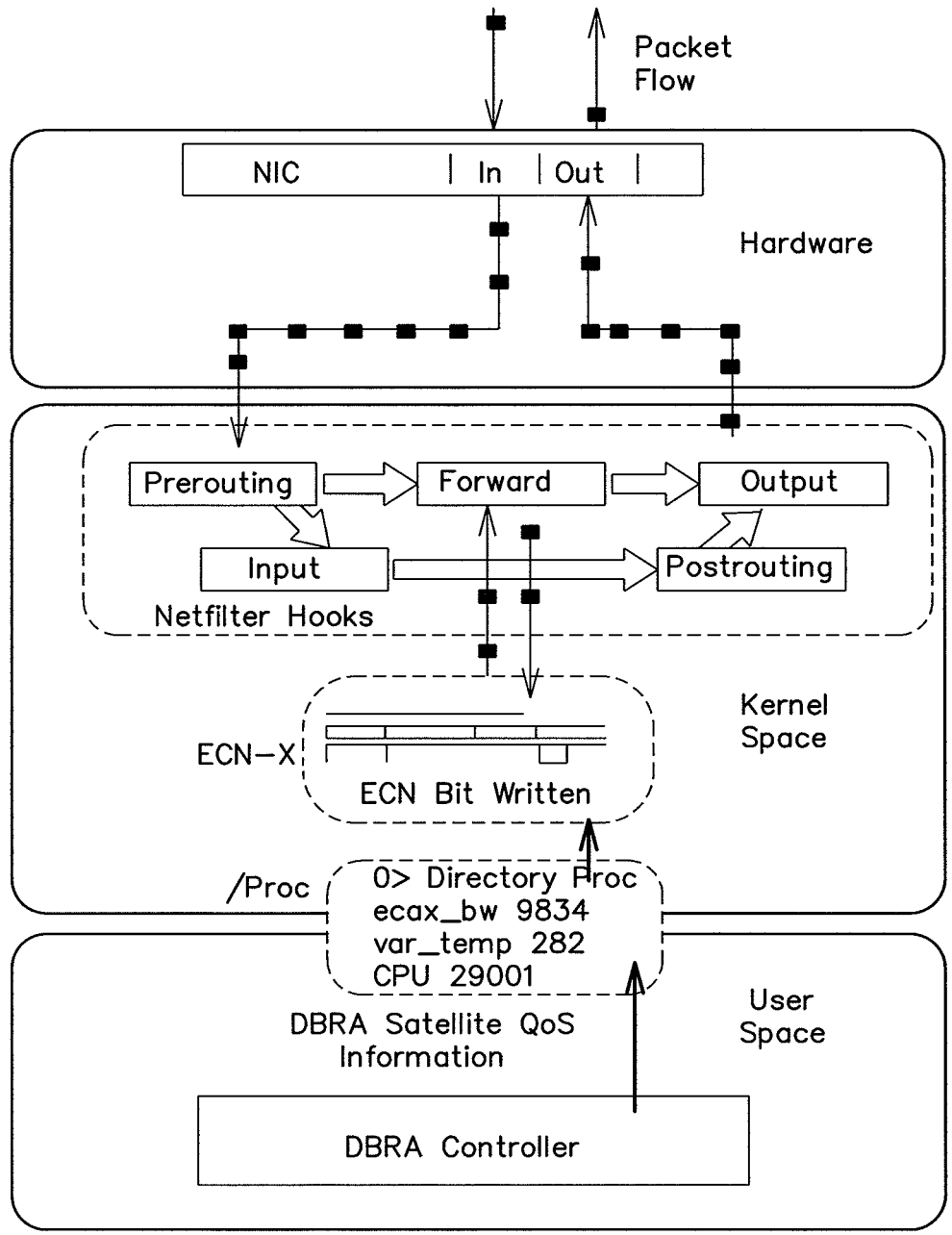
FIG. 23 is an example software component diagram of an ECN-X sender according to one embodiment of the present invention.
Figure 24:
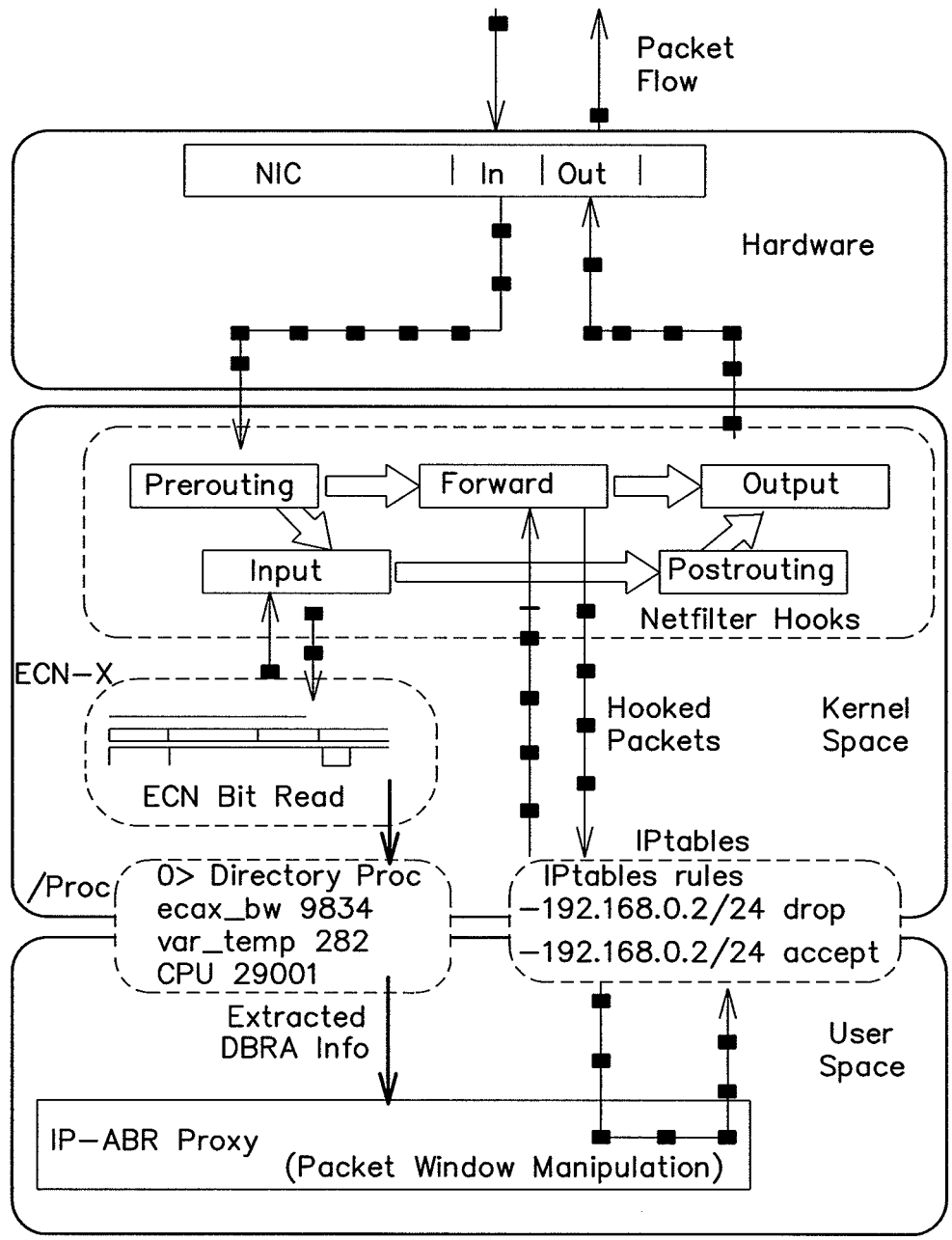
FIG. 24 is an example software component diagram of an ECN-X receiver according to one embodiment of the present invention.

Putting it all together, the two ECN-X kernel modules use the previously mentioned software tools and concepts to create a communications link across an IPsec gateway between a DBRA application on the black network and a proxy Controller on the red network. Integration of the components can be observed in FIGS. 23 and 24. Herein we will describe the software modules themselves. Where unspecified it can be assumed that the description applies to both sender and receiver modules.

Module Initialization

As part of the kernel module startup procedure we prepare our two software links: Netfilter capturing and procfs communication. Initialization is done in a pre-established function named init module( ) The Netfilter setup includes the following definitions:
netfilter_ops.hook=main_hook;
netfilter_ops.pf=PF_INET;
netfilter_ops.hooknum=NF_IP_FORWARD;
netfilter_ops.priority=NF_IP_PRI_FIRST;
nf_register_hook(&netfilter_ops);
The 'hook' variable refers to the function in which the bulk of our code exists; it is called every time a packet is hooked. 'pf' refers to our protocol family which in this case is IPv4 (known typically to network sockets as PF INET). 'hooknum' tells Netfilter to attach our function to the specified hook. The relevant hook for both the sender and receiver modules is the FORWARD hook as they are themselves simply routing packets forward. In one implementation, the receiver module may use the INPUT hook since both the receiver and the TCP destination were in the same machine. Finally 'priority' provides the option for enumerating various functions on the same hook. Since we have no others we place it on a first priority level. The of register hook( )function registers our request with Netfilter. As part of the initialization, the procfs variable file may be created:
ecn_file=create_proc_entry("ECN_change", 0644, NULL);
strcpy(ecn_data.name, "ECN_change");
strcpy(ecn_data.value, "0");
ecn_file->data=&ecn_data;
ecn_file->read_proc=proc_read_data;
ecn_file->write_proc=proc_write_data;

From the proc fs.h header, the create proc entry( )function is called to create a variable file with specific permissions. Within the file system the file appears as /proc/ECN change, where the initial '/' is the root, or main OS folder. If read with a text editor the ECN change file would contain "ECN change=0". Making the variable file point to an arbitrary object variable, any modification of the same would result in /proc/ECN change also showing the change in userspace. The next two lines are also important, as procfs requires individual "call back functions" for each file. These two definitions refer to locally implemented functions which handle data transfer between the module and the procfs file. The functions are called when a file is accessed in userspace to provide reading or writing interfaces, instead of allowing direct interaction with kernel memory. In the functions correct data sizes and accurate data transfers should be used to avoid errors which might not only crash the software, but the machine itself.

External Declarations

The procfs file data type may be declared. Because these dynamic files can display a whole variety of information, and allowing for the individual handling function described before, we need to define a local format for the specific procfs data type that we are using. In this case we have a simple definition consisting of a name and a data value, which, in one embodiment, are both strings:
struct proc_data_type {
char name[DATA_SIZE+1];
char value[DATA_SIZE+1];
};
The object of type proc data type can then be assigned to the 'data' item of the procfs file, and will display as the content of the dynamic file as was explained in the previous section. Various functions it has been already discussed also fall into this category. proc read data( ) and proc write data( ) are defined outside of the main function to provide on the spot, independent, response to the procfs variable. Other functions include init module( ) and cleanup module( ) which deal with the module itself. init module( ) was discussed previously, and cleanup module( ) is its counterpart which is in charge of purging any leftover variables or objects from the initialization. As one might expect when the /proc entry and the hook attachment are removed, this may be done within the cleanup function with the following lines:
nf_unregister_hook(&netfilter_ops);
remove_procentry("ECN_change", NULL);

Finally, the last three externally declared functions are tools to simplify operations. One of the tasks that is made difficult in kernelspace is converting from a string to an integer and vice-versa. Because of a lack of libraries for these tasks, and the need to change types between interfaces (e.g. ECN-X message to procfs variable) two functions could be created for this purpose: intToString( ) and stringToInt( ) The third function is overall the most useful in the sender module. changeECN( ) provides a quick way to modify a held packet's ECN bits to the desired value. Furthermore after the value has been changed the packet is updated with a new checksum. This is usually a time-consuming task, however using a hardware-specific assembly checksum function library (here the asm-386/checksum. h, though available for other architectures), these operations may be performed without delaying the packet noticeably. The following is an example of an optimized function:
void changeECN(struct sk_buff *buff, int ecn){
/* Modify ECN bits in TOS field */
buff->nh.iph->tos=(buff->nh.iph->tos ecn);
/* Adjust IP checksum */
buff->nh.iph->check=0;
buff->nh.iph->check=ip_fast_csum((unsigned     char    *) buff->nh.iph,buff->nh.iph->ihl);
}

Main Hook (Sender Module)

In this program the main function is referred to as the main hook, and may be declared as:
unsigned int main_hook(unsigned int hooknum,
struct sk_buff **skb,
const struct net_device *in,
const struct net_device *out,
int (*okfn) (struct sk_buff*))
{ . . . }

The reason this becomes the main section of the program is that the influx of packets is dependent upon for operations, and therefore cannot act asynchronously with respect to the outside world. Whether receiving packets or sending them, the only time the system executes any meaningful work is when a packet arrives, or in other words when the main hook( ) function is called. Every time running the code within the main hook is completed, a return with an NF ACCEPT result is performed to indicate to Netfilter that the packet is free to be unhooked. Because a router receives a large number of packets from varying sources, each packet needs to be identified as belonging to the correct flow. The first check is with regard to the Ethernet port. There is a priori knowledge that packets being routed to the proxy will only leave by way of the eth0 port. Netfilter's hook definition provides several resources and pieces of information including the packet buffer, the devices through which this packet is moving and miscellaneous hook details which can be used to sift through and quickly discard any unusable packets. With this information, the net device 'out' may be tested for the correct port. Another packet detail that may be tested for is the value of the ECT or ECN Capable Transport flag, to make sure the control data will be carried through the IPsec gateway. This can be tested using the IP header definition provided by the linux/ip.h header in this way:
if((sock\_buff->nh.iph->tos & 2)==2)
{ ... }

According to one implementation, routers only use the ECT(0) codepoint and so testing for a matching 00000010 pattern in the TOS field may be performed. Each time, if a 'sending' flag has not been set previously, it is determined whether there is a message to send. The procfs file is tested for a value other than '0' which would describe a new bandwidth setting. On the occasion of finding a new message to send, the 'sending' flag is set and the SoF delimiter is sent. In one embodiment, a single bit SoF may be used and so using the held packet (it is held while in the hook function), the ECN bits may be modified instantly using the ECN modifying function in this way: changeECN(sock buff,3);. The '3' is of course the integer representation for '11' or more explicitly the CE codepoint which will serve as a notice to the receiver. The next few times the hook is called, the actual bandwidth setting may be sent in bitwise format. This may be implemented by using a simple divide by '2' scheme where each consecutive packet is attributed the remainder bit from each division. Every bit is also added to a separate modulo 'n' count which corresponds to the checksum of the message. The 'n' variable is pre-defined at the beginning of the program. Each sent bit is counted and once the message limit is reached the checksum flag is set to send the variable bit error check portion of the message. The checksum bits are calculated in the same way as the message and are sent thereafter. Once done, the 'sending' flag is cleared.

Main Hook (Receiver Module)

Within the main hook of the receiver module is a slightly more complex problem. The message has been sent and afterwards the message is found and tested for message characteristics, and possibly tested for possible corruption. In one example, the receiver may sift through all the received packets for incoming packets from the correct port and for those that are ECN capable. The operation may be organized in a similar fashion as in the sender module. For example, there may be a 'receiving' flag that serve as a reminder between packets as to whether the receiver is in the process of receiving a partitioned message, since each bit of the message becomes a new call to our function. Initially, a CE codepoint may be tested in a single packet which indicates the beginning of a message. Having found one, the receiver may prepare for a new message by setting the 'receiving' flag and clearing bit counts, checksum and bandwidth calculations from a previous message (according to one example implementation, this application is a never-ending loop). After having received an SoF delimiter a receive loop may be started to acquire the message. Because corruption can only be detected over the whole of the message, the receiver should be completed before performing validity checking. The receive function will capture as many bits as are defined for MSG SIZE. The data portion of the message may be then subjected to an exponential multiplier, 2n, where 'n' is the bit number, to convert the received value into an integer number which will represent a scaled bandwidth in Kbps. At the same time, each bit may be applied to a separate calculation which represents the checksum of the received message. In the same fashion, the checksum bits are received which are appended to the message. This received checksum can then be compared to the actual checksum of the received message to determine if data corruption occurred in the message. If corruption did occur, the message is dropped. Otherwise, the newly calculated bandwidth setting is sent to the procfs file which can be read by the IP-ABR Proxy.

POM

Packet Order Modulation (POM), as described above, is an evolutionary step beyond ECN-X insofar as it is simpler as well as more supportive to overall security. The following is an example implementation using Packet Order Modulation (POM) according to one embodiment of the invention.

POM Reordering Theory

Modulation is a word commonly reserved for a physical layer implementation of a communications scheme, which means to embed information in an otherwise empty carrier stream by varying some observable parameter. Higher level communication can then grow from a basic modulated signal using its basic symbols as a base for a more complex language. Now, if we redefine the higher level stream of data packets as a continuous empty carrier, that is to say we assume the occurrence of packets is a constant, then they can be modulated in a way so as to embed control information.

TABLE IV

Exponential vs. Factorial Growth

| Packets per message | Single-bit exponential growth ($2^n$) | Factorial growth ($n!$) |
|---|---|---|
| 1 pkt | 2 | 1 |
| 2 pkts | 4 | 2 |
| 3 pkts | 8 | 6 |
| 4 pkts | 16 | 24 |
| 5 pkts | 32 | 12 |
| 6 pkts | 64 | 720 |
| 7 pkts | 128 | 5040 |

The nature of the carrier in this case is a connection-based flow (TCP or ESP) which produces ordered packets. The order in which they travel, we realize, is of little importance since they are duly numbered and can be rearranged at their destination. What remains is a series of individually numbered items that can be rearranged into a distinct pattern. This is also known as a permutation set. The number of permutations on a set of n elements is given by n![19]. The nature of factorial growth is such that encoding in permutations would provide extensive increases in message bandwidth over ECN-X using the same underlying message size. That is, the number of unique 'characters' that can be represented using a binary message increases exponentially with every additional bit, or in this case every packet, whereas creating permutations out of the same number of packets would result in a much larger informational capacity. Table IV above shows that with only 7 packets one of 5,040 different messages may be sent using POM, whereas with the ECN-X system, the messages would be limited to 128. By avoiding the use of actual bits and creating our own communication symbols, the limitations of binary characters and available packet space is not deterrent.

POM/IPsec Interaction

The simple reason why POM can work through IPsec as explained, is that IPsec being connection oriented allocates to its packets increasing sequence numbers exactly the same way that TCP packets do to provide easy identification. The ESP sequence number of course in no way relates to that of the TCP packet sequence number lying inside, yet this is irrelevant as there is a fixed translation mapping between the sequence number of the two flows. Any permutation performed on the ESP packets results in a like permutation of the underlying TCP packets as well, thus transferring the message across channels. This will only occur if there is a one-to-one flow relationship, that is, a preferable solution to this problem is to encapsulate the red flows into a single flow, which can be sequenced as a whole, before encapsulating it all in the IPsec tunnel. According to one embodiment, an additional piece of software may be used to do this which is described below.

Another important behavior of IPsec is its alertness to encroachment. An out-of-order packet will indicate one of two things to an IPsec gateway: it is either an attack, in which case there is no hesitation and the packet is instantly dropped, or the packet was simply routed through a slower path and it is accepted as valid.

The distinction lies in a packet's relative position with respect to other packets in a sequence. As mentioned above, IPsec includes a receiver sliding window, defined by the IETF, which is used to decide how far astray from its group a packet has to be before it is considered a threat. The sliding window size specifically states the sequence range of acceptable packets. The leading, or right edge of the window is defined by the largest sequence number received up to the present time. Any newer packets received with a larger sequence number cause the window to be moved to that point. Everything within the window, that is sequence numbers bounded by the largest received and the lowest sequence within the window are accepted. Beyond the trailing, or left edge of the window, everything is dropped. This guarantees acceptance at any time of reordered packets, as long as they are before or within the window.

RFC 2402 indicates, furthermore, that the window has to be at a minimum 32 packets long and in fact that it should be set as a default to 64. As an example, if messages are chosen to be 30 packets long, this would result in exactly $2.65 \times 10^{32}$ message combinations from which to select. In theory, it is further possible to perform permutations on the moving window by taking in new packets, and modifying those that continue to fall through the window without end, effectively providing a number with infinite permutations. Reshuffling this many packets, of course, would lead to large delays and would eventually be stopped by the IPsec connection timers, but it does open opportunities.

Example Software Tools

Most of the software tools described as part of the ECN-X implementation are also used for POM. In the case of the POM receiver, the kernel module shell outside of the main program is exactly the same as that of the ECN-X receiver. The sender however is quite different, having been written as a userspace application. Of particular interest here are the iptables and libipq packages which replace Netfilter libraries in userspace. Iptables Iptables provides a system for creating packet routing rule sets within the Netfilter hooks context. The route command can only direct packets based on their destination addresses, whereas iptables can respond to a wide variety of conditions such as particular header values, protocols or even by random selection. Once identified, iptables can manipulate packets' routing, header fields, and even delete them all together. As an example to change the destination address of all incoming TCP packets from 10.0.2.1 to 1110.3.1, and to drop all other TCP packets from that address the commands would be, for example:

iptables –t nat –A PREROUTING –p TCP –s 10.0.2.1 –j DNAT 10.0.3.1
iptables –t nat –A PREROUTING –p TCP –j DROP The iptables' ability to pass these packets to userspace (where regular applications may use them) may be used, though clearly at the cost of some delay. The command line option "–j" refers to 'jumping' to some destination; "–j QUEUE" instructs iptables to jump the packet to a userspace queue where applications from userspace can see them, and manipulate them if need be. Libipq creates the userspace queue that handles packets brought down from kernelspace by iptables. It has a limited number of functions with which applications can interact with the packets, but enough to do any operations on the packet. Particularly, it may be desired to read and interact with the information contained by the packet, such as its sequence number field, to make decisions about how to reorder the messages, and to read the patterns later. The following functions may be used to 1) connect to the queue, 2) tell Libipq to copy the full packets to our buffer and 3) read in the next packet in the queue.

1| ipq_create_handle(0, PF_INET);
2| ipq_set_mode(h, IPQ_COPY_PACKET, BUFSIZE);
3| ipq_read(h, buf, BUFSIZE, 0);

Once the packet is in a local buffer, the packet can be read (if unencrypted) and manipulated. After operating on the packet, a call is made back to Libipq with instructions on how to deal with the packet in question. The ipq set verdict( ) function may be used to respond with a Netfilter verdict (returned through libipq) as to the fate of the packet. The following are acceptable packet verdicts, as defined by netfilter.h as of the 2.6.5 kernel:

define NF_DROP 0—Drops the packet instantly.
define NF_ACCEPT 1—Accepts the packet on this hook, and allows it to progress forward.
define NF_STOLEN 2—Tells Netfilter to forget about packet without freeing the socket buffer.
define NF_QUEUE 3—Queues the packet to Libipq (re-sends packet to end of queue).
define NF_REPEAT 4—Resends packet through this hook (may cause infinite loop).

As part of the complete POM system, there is an IPsec reordering problem. To create the 1-to-1 required ratio between the IPsec flow and the underlying TCP flow, it was appreciated that a commercially-available TCP encapsulation tool may be used. Such tools may include, for example the well-known openVPN, PPTP, and pipsecd tools. The pipsecd application creates a straight-forward IPsec tunnel between two addresses with the help of the TunTap module and the SSH encryption libraries (these need to be installed independently), but without the need for kernel-compiled IPsec libraries. As always, any routing done to ensure security may be performed manually, through the route command.

Global Software Declarations

Both the sender and the receiver need to use a synchronized protocol to communicate properly. The following four variables specify how messages may be shaped and what their meanings to the receiver may be, and must be exactly the same across the two programs. In this case, the patterns may be used to effect global bandwidth control, but each pattern could refer to a variety of QoS control messages.

const int numSend=4; //How many packets to send per transmission (how long are msgs)
const int numMsgs=4; //How many messages types can we send
int bw[numMsgs]={0,48,92,192}; //Message Meanings (Global BW)
int msg[numMsgs] [numSend]={{4,2,1,3},{4,2,3,1},{4,3,1,2},{4,3,2,1}};
//{Permutation Patterns, 1 to numSend}

POM Sender

Figure 25A:
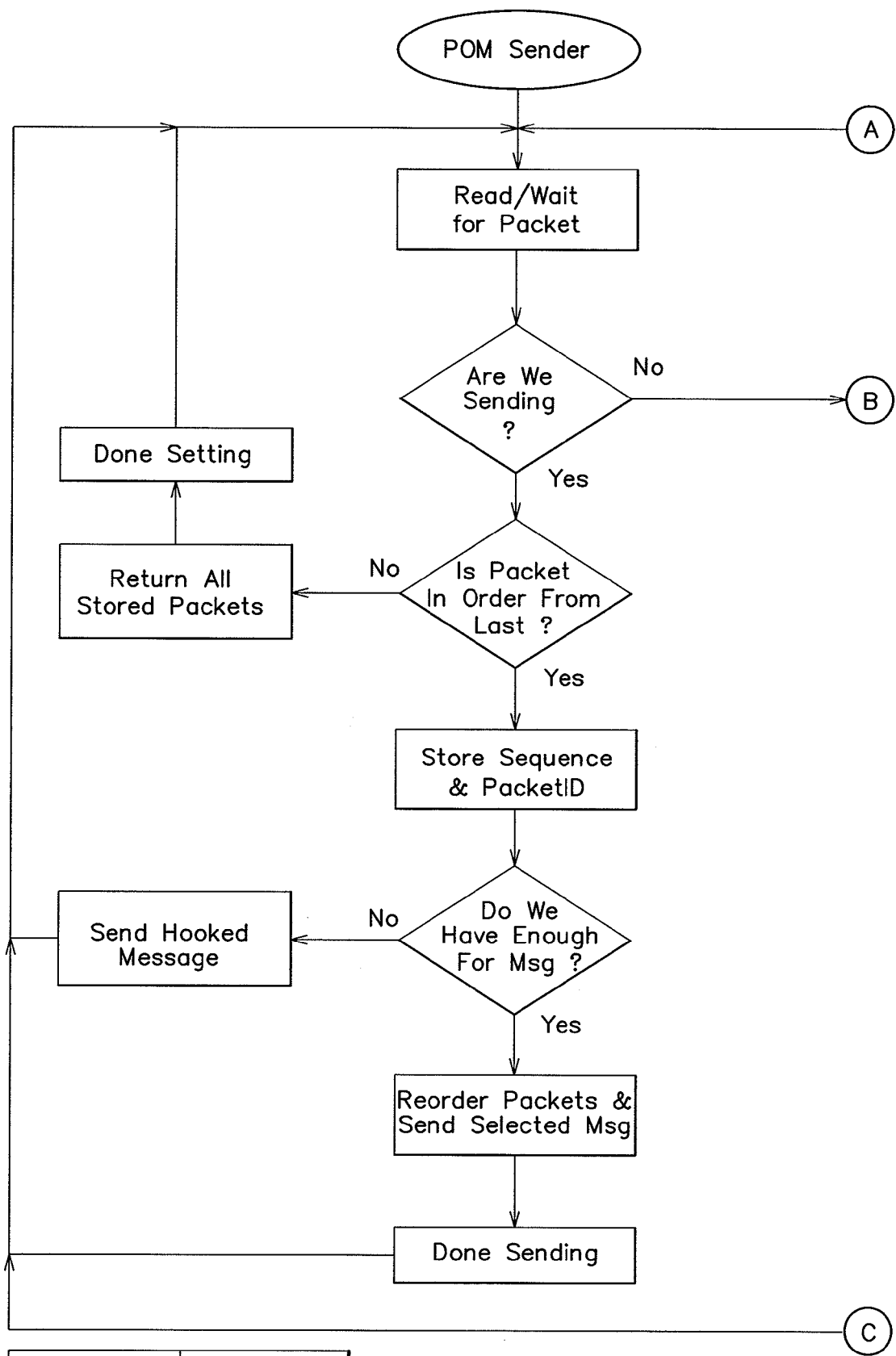
FIG. 25 is a diagram of a process performed by a POM sender according to one embodiment of the present invention.
Figure 25B:
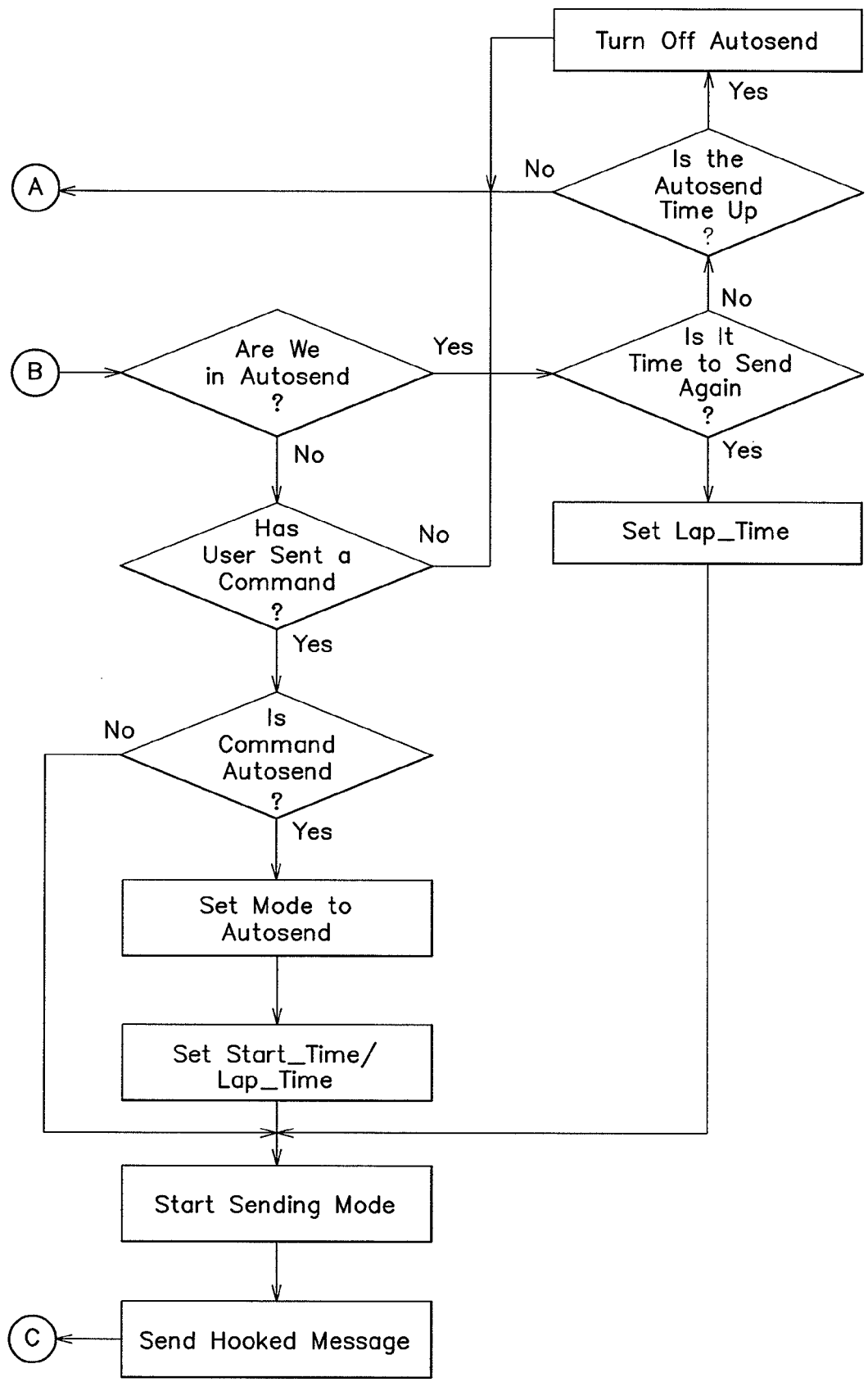

An implementation of the POM transmitter does not pose a difficult problem, but it does provide some interesting programing challenges. Considering the implementation of ECN-X, the practical differences between the two programs are minimal compared to the similarities. There may be a need for capturing packets, performing some modifications, evaluating some data and communicating with outside applications. Ideally most of the shell of FIG. 25: Software component diagram of POM sender. The ECN-X sender module could be applied to the POM sender.

It is noted that some Netfilter implementations would not allow the reordering of packets in kernelspace. Specifically, the problem lies in not being able to easily 're-inject' a packet back into a hook after having first taken it out, that is supplying Netfilter with the NF STOLEN command. This is of crucial importance if several packets are to be held with the intention of replacing them in the stream in a different order. After some investigation we found an obscure, undocumented function, extern void nf_reinject(struct sk_buff *skb, struct nf_info *info,unsigned int verdict); in netfilter.h which at first seemed able to solve the problem. Unfortunately the required nf info struct is extremely difficult to recreate from a packet and we wasted a large amount of research time without benefit. Because a kernel implementation would be ideal in future work, a function may be used to extract an nf info struct from a currently held packet in a Netfilter module, which could be reused with the nf reinject function later on.

Figure 26:
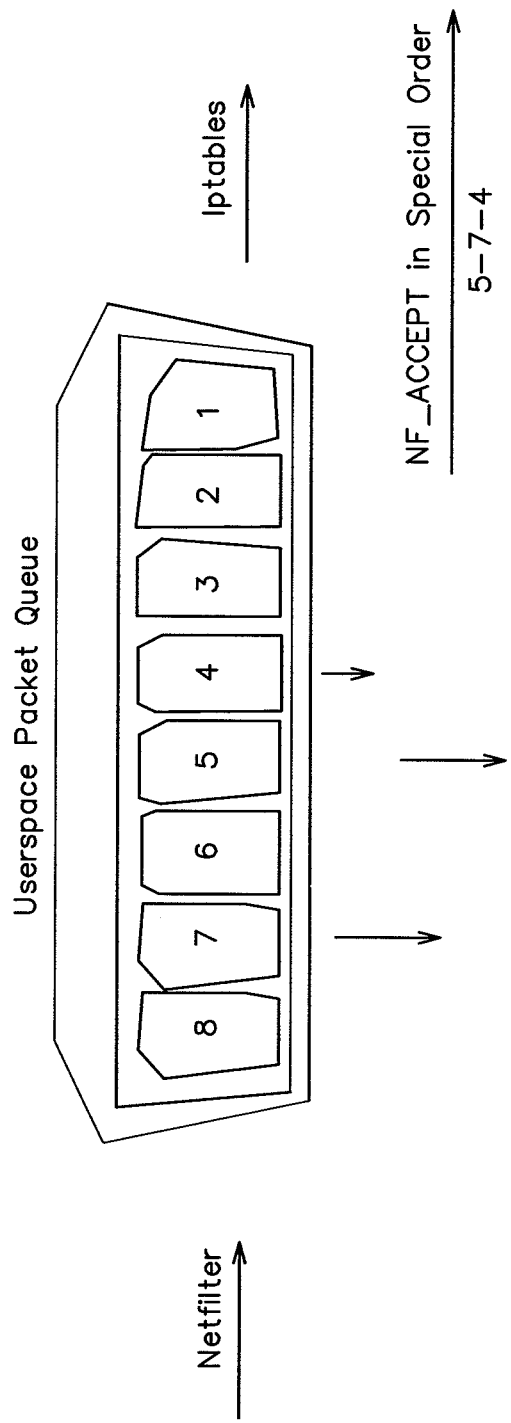
FIG. 26 is an example userspace queue reordering using libipq.

Using iptables, kernel hooks can be attached to and packets may be rerouted to a local queue created by Libipq where reordering may be accomplished. Libipq unfortunately faces the same limitations as the Netfilter API insofar as it cannot re-inject packets that have been completely removed from the internal kernel flow. This queue however has the advantage that it exists outside of the kernel. As part of its design it provides a sink for Netfilter hooked packets while the target userspace program is not available for processing. In one view, the Libipq userspace queue can be seen as a self-replenishing bookshelf of individually accessible packets from which to select (see FIG. 26). Specifically, a packet-shelf may be stacked and catalogued by creating an array of amassed packet IDs every time the hook is called. The function may be returned from without releasing the packet with a decision such as NF ACCEPT or NF DROP. The queue may be then forced to keep the packet in store while its record number is held for use later. This would ordinarily be dangerous, as it could cause a buffer overflow in the queue; however, care can be taken to keep within bounds by checking, and if need be changing, the queue size through the procfs variable located at /proc/sys/net/ipv4/ip queue maxlen (only visible while the ip queue module is loaded).

At the point wherein there are enough of these IDs for a full message, a return function may be called such as ipq set verdict( ) with the IDs in the permuted order allowing NF ACCEPT decisions for all of them. This sends the packets back through the kernel flow in the order desired. Main Function Body Having created an "ipq" handle the program simply enters an infinite loop around the ipq read( ) function, continuously checking for new queued packets. ipq read( ) performs a blocking read so that it may be assumed that a packet has reached us if we exit the read. We still want to perform a check for a correct read however, and we may use ipq message type( ) on the buffer to do so. A return of the constant NLMSG ERROR indicates a read error. More likely than not, this error will correspond to the application being run without superuser privileges. A return of IPQM PACKET indicates a good packet, whereas any other returns are of no interest. Thus, the core of the program may be kept within the following switch statement:
switch(ipq_message_type(buf)) {
case NLMSG_ERROR: {
fprintf(stderr, "Received error message % d\n", ipq_get_msgerr(buf));
break;
}
case IPQM_PACKET: {
[do any packet changing in here!]
}
default: {
fprintf(stderr, "Unknown message type!\n");
break;
}
}

As a convenient way to interact with the packet information ipq get packet( ) is used on the packet buffer to acquire a pointer to a structure of ipq packet msg type, which is defined as the following:
typedef struct ipq_packet_msg {
unsigned long packet_id; /* ID of queued packet */
unsigned long mark; /* Netfilter mark value */
long timestamp_sec; /* Packet arrival time (seconds)*/
long timestamp_usec; /* Packet arrvial time (+useconds)*/
unsigned int hook; /* Netfilter hook we rode in on */
char indev_name[IFNAMSIZ]; /* Name of incoming interface */
char outdev_name[IFNAMSIZ]; /* Name of outgoing interface */
unsigned short hw_protocol; /* Hardware protocol (network order)*/
unsigned short hw_type; /* Hardware type */
unsigned char hw_addrlen; /* Hardware address length */
unsigned char hw_addr[8]; /* Hardware address */
size_t data_len; /* Length of packet data */
unsigned char payload[0]; /* Optional packet data */
} ipq_packet_msg_t;

The two pieces of information that interest us here, as we have mentioned, are the sequence number for sorting, and the packet ID numbers for re-sending. The packet ID is clearly labeled under the above definition as an integer in m.packet id where 'm' is here defined as the message through ipq packet msg t *m=ipq get packet(buf). The sequence number requires a little more scavenging through the packet header as follows:
payload=m->payload;
ip=(struct ip *) payload;
ip_hdr_len=ip->ip_hl*4;
tcp_hdr=(struct tcphdr *) (payload+ip_hdr_len);
seqNumber[i]=htonl(tcp_hdr->seq);

The sequence number is then stored in the ith position of an array called seqNumber. The packet ID is also stored in an identically indexed array so as to keep the two pieces of data correlated. Once this information is being collected for a packet flow, a suitable set of packets can be identified to act as a carrier for the POM message. One related issue is that keep-alive and other TCP control packets that are not part of the data flow will not carry sequence numbers. Packets may very likely have also been reordered in the transmission process by the time it reaches the sender. This may not affect the implementation as long as there is a contiguous sequence that can be used to reorder the packets. To avoid unauthorized exploitation of the system, it will be recommended that in this stage out-of-order packets are reordered in proper sequence. However, in one implementation, a complete, ordered, set may be identified by comparing the sequence number on each packet with its predecessor. Each valid packet is kept in the queue without verdict. In the case of a missing sequenced packet, all previously withheld packets may be quickly sent by returning NF ACCEPTS with each of the saved packet IDs. This ensures minimal delay for the data transferred through the TCP channel. If the necessary number of packets are collected, the packets may be reordered and the POM message sent. Using the protocol declarations discussed earlier, the permutation pattern may be selected and loop through the stored packets IDs, accepting each one in turn. The following loop may be used concisely performs the reordering:

```
for(pktCount=0;pktCount<numSend;pktCount++){
//Send message based on option chosen and order of message
//IM ACCOUNTING FOR NO ZEROES HERE i.e.
msg={52314} (by sub -1)
status=ipq_set_verdict(h, pktID[(msg[sendOption][pkt-Count]-1)], NF_ACCEPT, 0, NULL);
if (status <0)
die(h);
else
printf("Sent packet % d\n",msg[sendOption][pktCount]);
}
```

The note on accounting for "no zeroes" in this code refers to using permutation indices which do not begin at zero; the indices for packet IDs may thus require a manual reduction here.

POM Receiver

Figure 27:
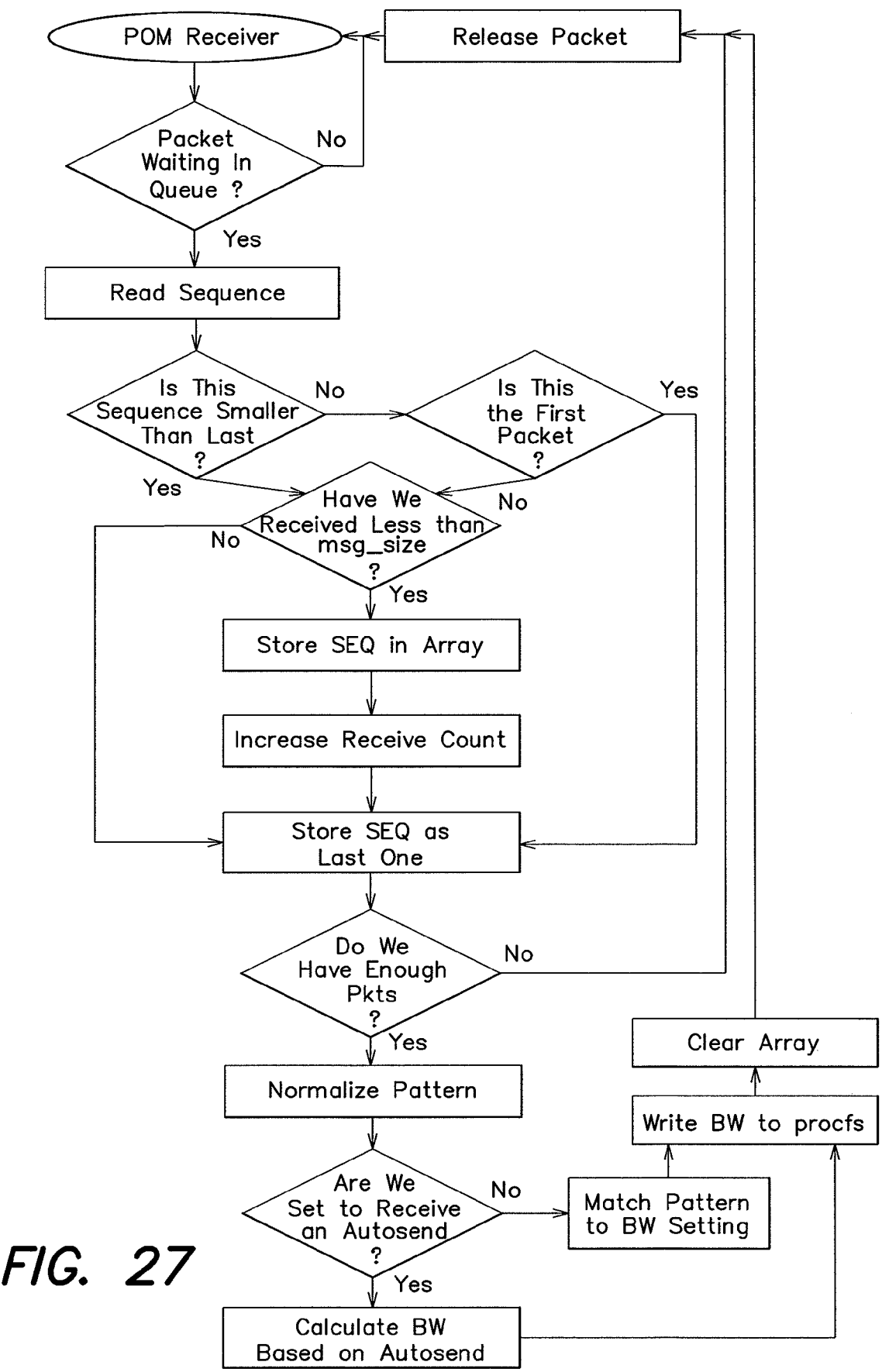
FIG. 27 is a diagram of a process performed by a POM receiver according to one embodiment of the present invention.

The POM receiver, unlike the sender, is concerned with reading only packet headers, an activity which we have already performed with the ECN-X receiver. FIG. 27 shows one example diagram of a POM receiver according to one embodiment of the present invention. The POM variation is slightly different in as far as handling the information once read from the packets, however most of the code remains the same. The program may be itself a kernel module and once again the software that is of interest is found within main hook( ) that is the function called on the arrival of a hooked packet. Inside the packet may be dissected with various pointers and extract the sequence number. Once this information is stored, the packet is accepted and sent back to the kernel. Then, a scan may begin for logical permutations in the stream of sequence numbers.

Figure 28:
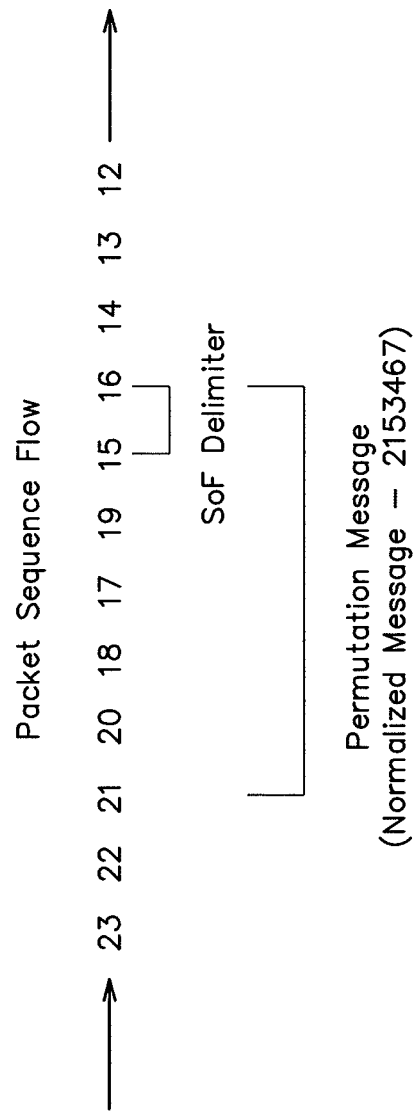
FIG. 28 is An example permutation message extracted from a sequence flow.

To demonstrate this, a single permutation set with no real error-detection or correction mechanism may be used; though, as part of the Doubly Encrypted POM system, these might not be necessary for a small travel distance. However to avoid the ideal, but processor-intensive task of scanning the message table every time a packet arrives, a SoF delimiter may be used which allows for simply storing the expected information and process the information later. In this case, the SoF is a reversed pair of packets; that is a larger sequence number preceding a smaller one (FIG. 28 shows an example). This constraint on packet order reduces the number of permutations, but very little compared to the message set size of N!. The new permutation limit is given by N!−(N−1)! where N!=N¤(N−1)! and N is the number of packets in the message. To detect an incoming message, the program stores the last sequence number received and compares it to the current number. Having found a reversed pair, the next N−2 sequence numbers are stored to create the full message. The completed ordered set is then compared with the various message patterns to decipher the message. Because there is a lack of a complete set of permutation messages, that is out of N! variations only some fraction is used, then the likelihood of matching a permutation to a message also becomes a partial validity check at this point.

A larger permutation set with less messages could be used as a deterrent for reorder anomalies, though it would also add to the algorithm search time. If a match is found here, then the bandwidth allocation indicated by the pattern is applied to the IP-ABR Proxy through the procfs dynamic variable. The receiver then continues to scan for sequence numbers for the next message.

POM Control

According to one embodiment, the POM messaging system may ultimately be controlled by the DBRA directly, but in some implementations a direct and flexible method for sending messages may be required. As shown in the startup screen for the sender application, beast(pts/103): . . . Code/reorder>./reo
Starting up . . .
1—0 kilobytes
2—48 kilobytes
3—92 kilobytes
4—192 kilobytes
5—Autosend
You may enter send options whenever (press enter after) . . . .

keyboard input is accepted anytime while running A non-blocking keyboard read is used to check for input only if we are not already in the process of a sending a message, and also if we have a valid start packet for a message. The current packet is of course quickly resent if there is no waiting keyboard input. The fifth option was implemented later on to provide a way to send constant messages without having to manually input them. Three variables in the main function determine how the autosend may operate:

int autoOption=4; //Which of the messages do we keep sending
double autoTime=720; //Number of seconds to keep sending for
double autoInc=60; //Delta of time in which to send another message The settings specify a continuous send of one particular message over a repeating interval for a given period of time. On the receiver side, a similar option sets the application on "notch" mode. The receiver, if set to this mode by the defined constant useNotch, will recognize the third and fourth messages as decrement and increment instructions respectively. The following example code defines the rules of the notch mode in the receiver:

define useNotch 1//Set receiver on notch mode
//(This invalidates normal messages, message settings below)
define notch 1//Amount by which to increment bandwidth (KBps)
define initBW 1//Initial setting of bandwidth (does not override proxy until incremented)
define msg1 2//Replaces Messages 1 and 2 to x1 and x2 KBps
define msg2 8//3 and 4 in notch mode represent decrement and increment This added implementation is explicitly for use as a testing device here, however the idea of notch increments and decrements is still valid as a communications protocol variation for future implementations.

IPsec Encryption Tunnel

Clearly one of the most important facets of the testbed has to be the implementation of the obstacle which is being overcome. According to one implementation, it may be desired that the IPsec application is a full-bodied implementation with some considerable and active user community testing and support. According to one embodiment, FreeS/WAN, or Free Secure Wide Area Network project may be used, but the well-known Linux kernel with its set of IPsec tools may also be used, among others.

IP-ABR Proxy

According to one implementation, the IP-ABR application needs to be placed directly in the path of the ACK packets for the TCP flow to be manipulated. Considering a network with a single gateway communicating with the outside world the proxy should be adjacent to this gateway, through which all flows will pass. In our case two single end-hosts will represent two small networks, and will create all the traffic that is to pass through the satellite link In this case, the proxy may be placed on the receiving end-host where the ACK packets originate, and to which the software requires direct access. The proxy could just as appropriately have been placed on the sender with ip tables instructions on forwarding incoming packets through it, instead of for those outgoing. The proxy is activated using the alternate procfs communications method, and set as a command line option to some initial global bandwidth setting. Thereafter the original proxy controller may be disabled.

Hardware Configuration

Figure 29:
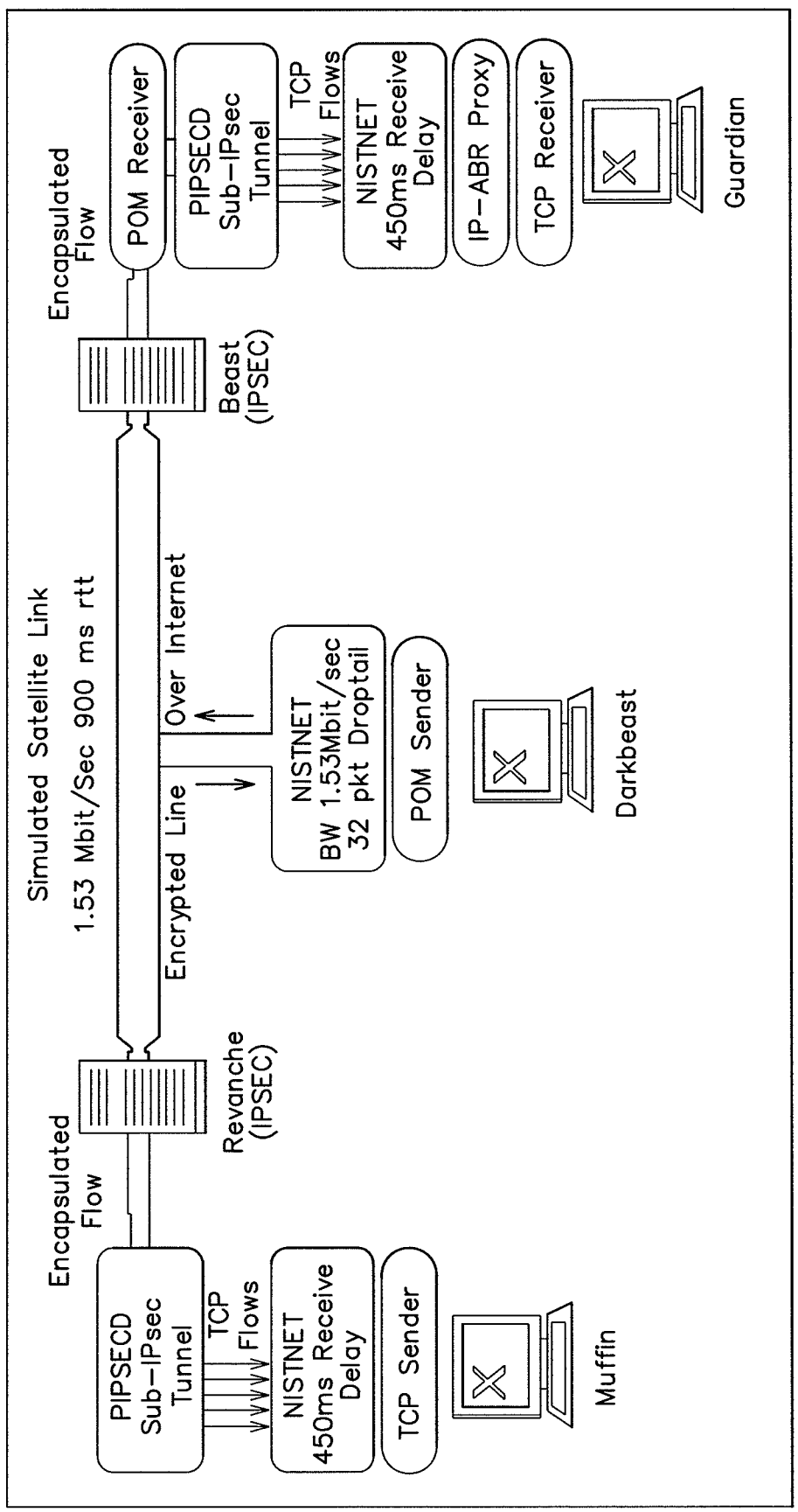
FIG. 29 is an example testbed using five personal computers (PCs).

Given the software architecture described in the last section, the very minimum hardware architecture that we require in this case may involve five personal computers. Three, as discussed, may carry NISTnet software and so are operated using a 2.4.27 kernel configuration. The two end machines are also equipped with the traffic generator software, and one of these also holds the IP-ABR Proxy (see FIG. 29). The center PC in the image loosely represents the satellite, but is more accurately described as the DBRA transmitter. This machine contains the control information, as well is the origin point of any messages sent using the previously described methods. And finally, the two IPsec gateways are placed between the previous three; these operate on 2.6.5 versions of the Linux kernel.

A number of TCP/IP communication modalities are provided herein for the purpose of passing DBRA control data through an otherwise closed IPsec gateway. The purpose was not to expose possible attacks on an IPsec protected connection, but in fact to improve upon IPsec by providing new methods of communication within the boundaries of the standard in support of QoS services for TCP/IP networks. Designing and analyzing various through-IPsec signaling methods may help to develop some ideas about the elements that make an ideal through-IPsec communication system; not just as an independent tool, but even more so as part of a fully secure DBRA scheme. Thus, two fully implemented methods may be used, ECN-X and POM.

These may be implemented as application software to further test the theoretical communication channels in a real IPsec bounded network, while using IP-ABR Proxy control mechanisms. To achieve the goal of creating a practical implementation, a five PC testbed may be created to emulate a real IPsec encrypted satellite link. The system emulates long satellite delays, and constrains the flow to a fixed bandwidth as would be encountered in an actual radio up-link The testbed allosws for the software implementation of through-IPsec communications and DBRA controlled QoS enforcing proxies to be tested in a real network while being subjected to real TCP traffic, which is itself being manipulated by the proxy under the control of our systems.

The development of this testbed also leads to greater practical understanding of IPsec, such as its speed limitations when realized as a software implementation and the impact this can have on TCP behavior. The results of the testing, IPsec software implementation speed limitations not withstanding, are several successful demonstrations of through-encrypter real time control of per-flow bandwidth using both ECN-X and POM. ECN-eXpropriation revealed the hidden benefits of the ECN header bits and provided a way to communicate along both directions of the IPsec gateway. The ECN service used in routers today is accepted as a necessary option as part of the IPsec standard, and when enabled allows certain codepoints to transcend from a TCP header to an ESP header and back again, which can be used as messaging scheme. Piggybacking a single bit per packet, each encoded as an ECN codepoint, messages are created that span several packets which pass through IPsec and deliver the necessary DBRA control information to the proxy on the red side. Certain restrictions apply, such as requiring the underlying TCP flow to be ECN capable, an option that can only be activated by the TCP end-hosts. The IPsec ECN option also has to be enabled; a more serious implication. If blocked, the ECN-X channel becomes incapable of operation.

While POM can only communicate from black to red, it does possess some benefits of particular importance to the current situation. POM has the unique feature of being completely independent of any and all IPsec administration constraints, by way of exploiting the very nature of packet-switched networking: the expectation and acceptance of packet reordering. Representing information as permutations of sequenced packets allows messages to pass through IPsec effortlessly. This approach also turns out to offer an improved communication scheme by providing a factorial increase in the number of available message symbols with the number of packets used to transport a message. Considering these features, the POM channel is a superb choice for through-IPsec DBRA communications, but could also be considered potentially harmful if exploited for other uses. Because reordering is not blocked by the secure gateway, our POM encryptor could be configured to order incoming packets so as to block outside messages seeking to exploit packet reordering communications. Practical analysis of the DBRA framework also resulted in the Doubly Encrypted POM scheme, a revision of the DEAC idea whereby double encryption is used with Packet Order.

Originating as an idea for the On-rack Middleman method, "on-rack" security allows the extension of the abstraction of red security to contain the control system without actually compromising the original secure system. Defining the red side's physical network rack as a middle point, an encrypted tunnel may be created to the DBRA station on the black side; a safe channel with which to pass control information from the satellite, to the edge of the IPsec gateway. The channel carries a stream which is an encryption of the control information along with the already encrypted red data, creating a single, unidentifiable, doubly encrypted flow. On the rack itself, through-IPsec communication may be performed which is protected by physical security. Likewise on the red side the IP-ABR Proxy is placed adjacent to the gateway on the rack, completely insuring the DBRA control information is never publicly visible, either on the black or the red side. Thus, opening a channel for malicious intent around IPsec would require capture of the physical rack on which the IPsec gateway itself lies. This improvement enhances security as well as performance by allowing direct communication between the satellite router and the secure network at which POM is applied. Furthermore the extended rack needs to exist only in a single network per COI, since having the control information within a red network means that it can be passed to all other legitimate proxy-controlled networks through the regular IPsec tunnels. The result is a completely secure, as well as dependable communications system for DBRA to IP-ABR control messaging in an IPsec secured network.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for performing quality of service function in a secure communication network comprising at least one computer system, the method comprising acts of:
- determining a bandwidth allocation, by a controller located outside the secure network, for the at least one computer system, located within the secure network;
- providing a first communication channel to the at least one computer system and communicating information via the first communication channel across a security barrier;
- providing a second communication channel from the controller for communicating control information to the at least one computer system across the security barrier;
- communicating the control information via the second communication channel across the security barrier to the secure network without compromising security, the control information being indicative of the determined bandwidth allocation, wherein the security barrier prohibits direct communication from the controller located outside of the secure network to the at least one computer system located within the secure network;
- communicating the control information to the at least one computer system; and
- using the control information to modify communication behavior of the at least one computer system.

2. The method according to claim 1, wherein the act of communicating control information further comprises an act of communicating the control information to a proxy system.

3. The method according to claim 2, wherein the act of communicating control information further comprises an act of communicating the control information by the proxy system to the at least one computer system.

4. The method according to claim 1, wherein the act of communicating control information further comprises an act of communicating the control information by modulating a flow of packets across the security barrier.

5. The method according to claim 4, wherein the act of communicating control information further comprises an act of modulating an order of packets communicated across the security barrier.

6. The method according to claim 5, wherein the act of communicating control information further comprises an act of receiving the modulated order of packets within the secure network.

7. The method according to claim 6, further comprising an act of determining the control information in response to the modulated order of packets.

8. The method according to claim 1, wherein the act of communicating control information further comprises an act of communicating the control information by including the control information within packets that are transmitted across the security barrier.

9. The method according to claim 1, wherein the act of communicating control information further comprises an act of communicating the control information by sending the control information within a secure channel established across the security barrier.

10. The method according to claim 1, wherein the act of communicating control information further comprises an act of communicating the control information by dropping packets in a pattern that includes the control information.

11. The method according to claim 1, wherein the act of communicating control information further comprises an act of communicating the control information by changing congestion notification bits a pattern that includes the control information.

12. The method according to claim 1, wherein the act of using the control information to modify communication behavior of the at least one computer system comprises an act of setting a window value in a memory of the at least one computer system.

13. The method according to claim 1, further comprising an act of monitoring network performance of a community of interest (COI).

14. The method according to claim 1, further comprising an act of monitoring network performance of the at least one computer system.

15. The method according to claim 14, wherein the act of determining a bandwidth allocation for the at least one computer system is responsive to the act of monitoring network performance of the at least one computer system.

16. The method according to claim 1, wherein the secure network includes a secure network implementing IP security (IPsec).

17. The method according to claim 1, wherein the secure network includes a secure network implementing High Assurance Internet Protocol Encryptor (HAIPE).

18. The method according to claim 1, wherein the act of determining a bandwidth allocation includes an act of determining an allocation of TCP bandwidth.

19. The method according to claim 1, wherein the quality of service function includes Internet Protocol Available Bit Rate (IP-ABR).

20. The method according to claim 1, wherein the act of determining a bandwidth allocation for the at least one computer system is performed by a Dynamic Bandwidth Resource Allocation (DBRA) system.

21. A system for performing quality of service functions in a secure network comprising at least one computer system, the system comprising:
- a controller configured to determine a bandwidth allocation for the at least one computer system, located within the secure network, the controller located outside the secure network;
- a first gateway configured to provide a first communication channel to the at least one computer system for communicating information across a security barrier;
- a second gateway configured to provide a second communication channel across the security barrier, to receive control information from the controller and to communicate the control information into the secure network without compromising security;
- a proxy system configured to communicate the control information to the at least one computer system,
- wherein the security barrier prohibits direct communication from the controller located outside the secure network to the at least one computer system located within the secure network,
- wherein the control information is configured to modify communication behavior of the at least one computer system.

22. The system according to claim 21, wherein the proxy system is configured to communicate the control information directly to at least one computer system.

23. The system according to claim 21, wherein the proxy system is configured to communicate the control information to another proxy system located in the secure network.

24. The system according to claim 23, wherein the another proxy system is configured to communicate the control information to the at least one computer system.

25. The system according to claim 21, wherein the proxy system is configured to communicate the control information by modulating a flow of packets across the security barrier.

26. The system according to claim 25, wherein the proxy system is configured to modulate an order of packets communicated across the security barrier.

27. The system according to claim 26, wherein the at least one computer system is configured to receive the modulated order of packets within the secure network.

28. The system according to claim 26, wherein the proxy system is configured to communicate the control information to another proxy system located in the secure network, and wherein the another proxy system is configured to receive the modulated order of packets within the secure network.

29. The system according to claim 28, wherein the another proxy system is configured to communicate the control information to at least one computer system.

30. The system according to claim 28, wherein the another proxy system is configured to determine the control information in response to the modulated order of packets.

31. The system according to claim 21, wherein the proxy system is configured to communicate the control information by including the control information within packets that are transmitted across the security barrier.

32. The system according to claim 21, wherein the proxy system is configured to communicate the control information by sending the control information within a secure channel established across the security barrier.

33. The system according to claim 21, wherein the proxy system is configured to communicate the control information by dropping packets in a pattern that includes the control information.

34. The system according to claim 21, wherein the controller includes a Dynamic Bandwidth Resource Allocation (DBRA) system.

35. The system according to claim 21, wherein the secure network includes a secure network implementing IP security (IPsec).

36. The system according to claim 21, wherein the secure network includes a secure network implementing High Assurance Internet Protocol Encryptor (HAIPE).

37. The system according to claim 21, wherein the controller is configured to determine an allocation of TCP bandwidth.

38. A non-transitory computer-readable medium encoded with instructions for execution on a computer system, the instructions when executed, performing a method for performing quality of service function in a secure communication network comprising at least one computer system, the method comprising acts of:
    determining a bandwidth allocation, by a controller located outside the secure network, for the at least one computer system, located within the secure network;
    providing a first communication channel to the at least one computer system and communicating information via the first communication channel across a security barrier;
    providing a second communication channel from the controller for communicating control information to the at least one computer system;
    communicating the control information via the second communication channel across the security barrier to the secure network, without compromising security, wherein the security barrier prohibits direct communication from the controller located outside of the secure network to the at least one computer system located within the secure network, the control information being indicative of the determined bandwidth allocation;
    communicating the control information to the at least one computer system; and
    using the control information to modify communication behavior of the at least one computer system.

39. The non-transitory computer-readable medium according to claim 38, wherein the act of communicating control information further comprises an act of communicating the control information to a proxy system.

40. The non-transitory computer-readable medium according to claim 39, wherein the act of communicating control information further comprises an act of communicating the control information by the proxy system to the at least one computer system.

41. The non-transitory computer-readable medium according to claim 38, wherein the act of communicating control information further comprises an act of communicating the control information by modulating a flow of packets across the security barrier.

42. The non-transitory computer-readable medium according to claim 41, wherein the act of communicating control information further comprises an act of modulating an order of packets communicated across the security barrier.

43. The non-transitory computer-readable medium according to claim 42, wherein the act of communicating control information further comprises an act of receiving the modulated order of packets within the secure network.

44. The non-transitory computer-readable medium according to claim 43, further comprising an act of determining the control information in response to the modulated order of packets.

45. The non-transitory computer-readable medium according to claim 38, wherein the act of communicating control information further comprises an act of communicating the control information by including the control information within packets that are transmitted across the security barrier.

46. The non-transitory computer-readable medium according to claim 38, wherein the act of communicating control information further comprises an act of communicating the control information by sending the control information within a secure channel established across the security barrier.

47. The non-transitory computer-readable medium according to claim 38, wherein the act of communicating control information further comprises an act of communicating the control information by dropping packets in a pattern that includes the control information.

48. The non-transitory computer-readable medium according to claim 38, wherein the act of communicating control information further comprises an act of communicating the control information by changing congestion notification bits a pattern that includes the control information.

49. The non-transitory computer-readable medium according to claim 38, wherein the act of using the control information to modify communication behavior of the at least one computer system comprises an act of setting a window value in a memory of the at least one computer system.

50. The non-transitory computer-readable medium according to claim 38, further comprising an act of monitoring network performance of a community of interest (COI).

51. The non-transitory computer-readable medium according to claim 38, further comprising an act of monitoring network performance of the at least one computer system.

52. The non-transitory computer-readable medium according to claim 51, wherein the act of determining a bandwidth allocation for the at least one computer system is responsive to the act of monitoring network performance of the at least one computer system.

53. The non-transitory computer-readable medium according to claim 38, wherein the secure network includes a secure network implementing IP security (IPsec).

54. The non-transitory computer-readable medium according to claim 38, wherein the secure network includes a secure network implementing High Assurance Internet Protocol Encryptor (HAIPE).

55. The non-transitory computer-readable medium according to claim 38, wherein the act of determining a bandwidth allocation includes an act of determining an allocation of TCP bandwidth.

56. The non-transitory computer-readable medium according to claim 38, wherein the quality of service function includes Internet Protocol Available Bit Rate (IP-ABR).

57. The non-transitory computer-readable medium according to claim 38, wherein the act of determining a bandwidth allocation for the at least one computer system is performed by a Dynamic Bandwidth Resource Allocation (DBRA) system.

* * * * *

UNITED STATES PATENT AND TRADEMARK OFFICE
CERTIFICATE OF CORRECTION

PATENT NO.         : 8,549,135 B1
APPLICATION NO.    : 12/122055
DATED              : October 1, 2013
INVENTOR(S)        : Navid Yazdani et al.

Page 1 of 1

It is certified that error appears in the above-identified patent and that said Letters Patent is hereby corrected as shown below:

On the title page item (75) after Inventor: Navid Yazdani, Framingham, MA (US) add --David Cyganski, Holden, MA (US); James M. McGrath, Marlborough, MA (US); Nicholas Sherwood, Ithaca, NY (US); Roy E. Johnson, Arlington, MA (US); Pavan K. Reddy, Westborough, MA (US)--

Signed and Sealed this
Fifth Day of April, 2016

Michelle K. Lee
*Director of the United States Patent and Trademark Office*